(12) United States Patent
Tse et al.

(10) Patent No.: US 8,809,456 B2
(45) Date of Patent: Aug. 19, 2014

(54) POLYOLEFIN COMPOSITIONS AND METHODS OF PRODUCTION THEREOF

(75) Inventors: Mun F. Tse, Seabrook, TX (US); Aspy K. Mehta, Humble, TX (US); Joann M. Canich, Houston, TX (US); Matthew W. Holtcamp, Humble, TX (US); John R. Hagadorn, Houston, TX (US); Charles J. Ruff, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 20 days.

(21) Appl. No.: 13/449,939

(22) Filed: Apr. 18, 2012

(65) Prior Publication Data

US 2013/0281626 A1     Oct. 24, 2013

(51) Int. Cl.
*C08L 53/00* (2006.01)
*C08L 53/02* (2006.01)
*C08F 8/00* (2006.01)

(52) U.S. Cl.
USPC .............. 525/88; 525/98; 525/245; 525/265; 525/324

(58) Field of Classification Search
USPC .............................. 525/88, 98, 245, 265, 324
See application file for complete search history.

(56) References Cited

U.S. PATENT DOCUMENTS

| | | | |
|---|---|---|---|
| 3,754,046 A | 8/1973 | Calderon et al. | |
| 3,912,703 A | 10/1975 | Short | |
| 3,917,576 A | 11/1975 | Uraneck et al. | |
| 4,012,566 A | 3/1977 | Zelinski et al. | |
| 4,072,807 A | 2/1978 | Uraneck et al. | |
| 4,716,197 A | 12/1987 | Seiss et al. | |
| 5,446,102 A | 8/1995 | Oziomek et al. | |
| 7,132,503 B2 | 11/2006 | Pawlow et al. | |
| 2007/0231737 A1 | 10/2007 | Sugasaki | |
| 2010/0010161 A1 | 1/2010 | Arriola et al. | |
| 2013/0225774 A1* | 8/2013 | GRUBBS et al. | ............ 526/171 |

FOREIGN PATENT DOCUMENTS

| | | |
|---|---|---|
| CN | 101 230 119 | 7/2008 |
| WO | WO 2011/079799 | 7/2011 |

OTHER PUBLICATIONS

Wagener et al., Makromol. Chem. Rapid Commun. 12, 419-425 (1999).*
Craig et al., *Highly Efficient Acyclic Diene Metasis Depolymerization Using a Ruthenium Catalyst Containing a N-heterocyclic Carbene Ligand*, Macromolecules, 2001, vol. 34, No. 23, pp. 7929-7931.
Klee, *Telechelic Prepolymers and Macromonomers by Step Growth Processes*, Acta Polymerica, 1994, vol. 45, No. 2, pp. 73-82.
Maier et al., *Polymerization by [3 + 2]-cycloaddition, 5$^{\infty)}$ Telechelics with Isocyanate end-groups*, Makromol. Chem., 1993, vol. 194, No. 9, pp. 2413-2432.

* cited by examiner

*Primary Examiner* — Jeffrey Mullis
(74) *Attorney, Agent, or Firm* — Catherine L. Bell

(57) ABSTRACT

This invention relates to methods for producing an alkene terminated polystyrene, including: contacting a styrenic block copolymer and an alkene in the presence of a metathesis catalyst under conditions sufficient to produce an alkene terminated polystyrene having an unsaturation functionality of at least 0.7 and a MWD of about 1.5 or less. Methods for producing functionalized polymers and polyethylene blend composition comprising these functionalized polymers are also disclosed.

18 Claims, 6 Drawing Sheets

POLYOLEFIN COMPOSITIONS AND METHODS OF PRODUCTION THEREOF

FIELD OF THE INVENTION

This invention relates to styrenic modifiers for linear polyolefins.

BACKGROUND OF THE INVENTION

Polyethylene (PE) is categorized into different classes, based mostly on density and branching, for example high density polyethylene (HDPE), medium density polyethylene (MDPE), low density polyethylene (LDPE), linear low density polyethylene (LLDPE), very low density polyethylene (VLDPE), ultra high molecular weight polyethylene (UHMWPE), and ultra low molecular weight polyethylene (ULMWPE or PE-WAX). All of these are essentially linear except for LDPE, which has a branched structure.

Properties of PE generally depend on variables such as the weight-average molecular weight ($M_W$), molecular weight distribution (MWD=$M_W/M_n$), and the extent and type of branching (via crystallinity or densities). For example, $M_w$ and MWD control PE melt processability. Low $M_W$ leads to a low melt viscosity, resulting in fast processing and less energy consumption. However, low $M_W$ tends to decrease mechanical properties, so applications which rely on good mechanical properties, such as film blowing, typically require polymers with bimodal MWDs.

LDPE is traditionally the highest volume resin for blown films. However, an important feature in the film blowing process is its ability to generate a high degree of drawdown so that the gauge of the final film is much thinner than the die gap. However, this is limited by the strength of the melt in the bubble. If the nip roll speed is too high, the tensile stress in the bubble will exceed the cohesive strength of the melt, resulting in a rupture of the blown film.

LLDPE, which has similar low amount of crystallinity as LDPE, began to replace LDPE in the 1980s. LLDPE, having lower melt strength but higher drawn speed to break than LDPE, may be more easily drawn down than LDPE. Therefore, a thinner LLDPE film can be blown with the same strength as the LDPE film or a LLDPE film is stronger having the same thickness as the LDPE film.

However, there are some problems in the film blowing process of LLDPE. Most LLDPEs have higher MWs but narrower MWDs. Also, their short chain branching (SCB) does not provide shear thinning. Traditional LLDPEs contain no long chain branching (LCB). This, in combination with their narrow MWDs increases entanglement densities, which produces highly viscous melts that require lower processing speeds. Therefore, LLDPE is more viscous at the high shear rates when processed in the extruder and the die than LDPE, which contains a certain amount of LCB. The more viscous LLDPE will result in increased screw torque, barrel wear, and melt temperature, and more frequent occurrence of undesirable sharkskin at the die exit. At the same time, LLDPE shows lower extensional stresses at low strain rates occurring in the molten tube and bubble inflation regions, rendering a higher chance of bubble instability. The narrow MWDs of mLLDPEs (LLDPEs made using a metallocene catalyst) make them even more difficult to process than conventional LLDPEs.

Accordingly, the blown film industry continues to experience a need for polyethylene materials with balanced melt strengths and drawn speeds to break, which also exhibit shear thinning.

SUMMARY OF THE INVENTION

This invention relates to methods for producing an alkene terminated polystyrene, comprising: contacting a styrenic block copolymer and an alkene in the presence of a metathesis catalyst under conditions sufficient to produce an alkene terminated polystyrene having an unsaturation functionality of at least 0.7 and a MWD of about 1.5 or less.

This invention further relates to methods for producing a functionalized polymer, comprising: contacting a styrenic block copolymer and ethylene in the presence of a metathesis catalyst under conditions sufficient to produce a vinyl terminated polystyrene having an unsaturation functionality of at least 0.7 and a MWD of about 1.5 or less; and grafting the vinyl terminated polystyrene to a polyolefin to form a polyolefin/polystyrene graft copolymer.

The invention further relates to methods for producing a functionalized polymer, comprising: contacting a styrenic block copolymer and ethylene in the presence of a metathesis catalyst under conditions sufficient to produce a vinyl terminated polystyrene having a functionality of at least 0.7 and a MWD of about 1.5 or less; and contacting the vinyl terminated polystyrene with ethylene monomer in the presence of a polymerization catalyst system to form a polyethylene/polystyrene copolymer.

The invention yet further relates to polyethylene blend compositions, comprising: (i) 99.0 wt % or less of a linear polyethylene having a density of at least 0.910 g/cm³; and (ii) at least 1.0 wt % of a polyethylene/polystyrene graft copolymer comprising from about 70 wt % to about 98 wt % polyethylene and from about 2 wt % to about 30 wt % polystyrene.

DETAILED DESCRIPTION

Figure 1:
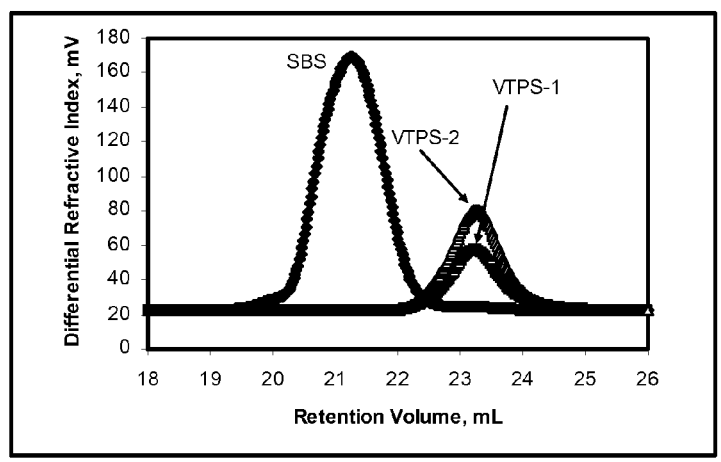
FIG. 1 depicts the GPC curves of SBS, VTPS-1 and VTPS-2 used in the Examples, where SBS is styrenic block copolymer, VTPS-1 is vinyl terminated polystyrene 1 and VTPS-2 is vinyl terminated polystyrene 2.

The inventors have surprisingly found that a blend of LLDPE (preferably mLLDPE) with a small amount (at least 1 wt %, preferably about 1 wt % to 20 wt %) of a highly branched PE composition can balance melt strength, draw speed to break, and shear thinning for optimum blown film process and properties. These polyethylene blend compositions have improved elasticity and shear thinning in the melt state, compared to the neat polyethylene. In embodiments herein, the highly branched PE composition comprises a polyethylene/polystyrene graft copolymer. The inventors have also discovered methods of making a vinyl terminated polystyrene with high unsaturation functionality (at least 0.7) and a narrow MWD (1.5 or less), which may be functionalized by grafting to a polyethylene to produce a polyethylene/polystyrene graft copolymer useful in the blend of LLDPE disclosed herein. These compositions, polymers, and methods of making them are discussed further herein.

The terms "linear polyethylene" and "linear ethylene polymer" are used interchangeably and refer to a polyethylene having a branching index (g') of 0.98 or more, preferably 0.99 or more, preferably 1.0 (1.0 being the theoretical limit of g'). Branching index (g') is determined as described in U.S. Patent Application Publication No. 2006/0173123, particularly pages 24-25. In the event there is a conflict between the size exclusion chromatography method described in U.S. 2006/0173123 and the size exclusion chromatography method described below, the method described in U.S. 2006/0173123 shall be used for determination of g'.

A "metallocene polyethylene" or an "mPE" is an ethylene polymer having a CDBI (Composition Distribution Breadth Index) of greater than 50%, preferably greater than 60%. CDBI is discussed further below.

An "mLLDPE" is an ethylene polymer (preferably a copolymer) having a CDBI of greater than 50% (preferably greater than 60%) and a density of 0.910 to 0.940 g/cm$^3$.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. For purposes herein, a polymer or polymeric chain comprises a concatenation of carbon atoms bonded to each other in a linear or a branched chain, which is referred to herein as the backbone of the polymer (e.g., polyethylene). The polymeric chain may further comprise various pendent groups attached to the polymer backbone which were present on the monomers from which the polymer was produced. These pendent groups are not to be confused with branching of the polymer backbone, the difference between pendent side chains and both short and long chain branching being readily understood by one of skill in the art.

An "alpha-olefin" is an olefin having a double bond at the alpha (or 1-) position. A "linear alpha-olefin" or "LAO" is an olefin with a double bond at the alpha position and a linear hydrocarbon chain. A "polyalphaolefin" or "PAO" is a polymer having at least two mer units. For the purposes of this disclosure, the term "α-olefin" includes $C_2$-$C_{20}$ olefins.

An ethylene polymer is a polymer having at least 50 mol % ethylene, with the balance being made up by one or more other hydrocarbon monomers, preferably $C_3$ to $C_{12}$ hydrocarbon monomers, preferably propylene, butene, hexene, octene, or mixtures thereof. A propylene polymer is a polymer having at least 50 mol % of propylene, with the balance being made up by one or more other hydrocarbon monomers, preferably $C_2$ and/or $C_4$ to $C_{12}$ hydrocarbon monomers, preferably ethylene, butene, hexene, octene, or mixtures thereof.

As used herein, Mn is number average molecular weight as determined by proton nuclear magnetic resonance spectroscopy ($^1$H NMR) unless stated otherwise, Mw is weight average molecular weight as determined by gel permeation chromatography (GPC), Mz is z average molecular weight as determined by GPC, wt % is weight percent, and mol % is mole percent. Molecular weight distribution (MWD) is defined to be Mw (GPC) divided by Mn (GPC). Unless otherwise noted, all molecular weight units, e.g., Mw, Mn, Mz, are g/mol.

For the purposes of this invention and the claims thereto, the new numbering scheme for the Periodic Table Groups is used as in CHEMICAL AND ENGINEERING NEWS, 63(5), pg. 27 (1985). Therefore, a "Group 4 metal" is an element from Group 4 of the Periodic Table.

The terms "catalyst" and "catalyst compound" are defined to mean a compound capable of initiating catalysis. In the description herein, the catalyst may be described as a catalyst precursor, a pre-catalyst compound, or a transition metal compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor.

A "catalyst system" is a combination of at least one catalyst compound, at least optional one activator, an optional co-activator, and an optional support material, where the system can polymerize monomers to polymer. For the purposes of this invention and the claims thereto, when catalyst systems are described as comprising neutral stable forms of the components, it is well understood by one of ordinary skill in the art, that the ionic form of the component is the form that reacts with the monomers to produce polymers.

An "anionic ligand" is a negatively charged ligand which donates one or more pairs of electrons to a metal ion. A "neutral donor ligand" is a neutrally charged ligand which donates one or more pairs of electrons to a metal ion.

A "scavenger" is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments, a co-activator can be pre-mixed with the catalyst compound to form an alkylated catalyst compound, also referred to as an alkylated invention compound.

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl," and "hydrocarbyl group" are used interchangeably throughout this document. Likewise, the terms "functional group," "group," and "substituent" are also used interchangeably in this document. For purposes of this disclosure, "hydrocarbyl radical" is defined to be $C_1$ to $C_{20}$ radicals, that may be linear, branched, or cyclic (aromatic or non-aromatic); and may include substituted hydrocarbyl radicals as defined herein. In an embodiment, a functional group may comprise a hydrocarbyl radical, a substituted hydrocarbyl radical, or a combination thereof.

"Substituted hydrocarbyl radicals" are radicals in which at least one hydrogen atom has been substituted with a heteroatom or heteroatom containing group, or with atoms from Groups 13, 14, 15, 16, and 17 of the Periodic Table of Elements, or a combination thereof, or with at least one functional group, such as halogen (Cl, Br, I, F), $NR*_2$, $OR*$, $SeR*$, $TeR*$, $PR*_2$, $AsR*_2$, $SbR*_2$, $SR*$, $BR*_2$, $SiR*_3$, $GeR*_3$, $SnR*_3$, $PbR*_3$, and the like or where at least one heteroatom has been inserted within the hydrocarbyl radical, such as halogen (Cl, Br, I, F), O, S, Se, Te, $NR*$, $PR*$, $AsR*$, $SbR*$, $BR*$, $SiR*_2$, $GeR*_2$, $SnR*_2$, $PbR*_2$, and the like, where $R*$ is, independently, hydrogen or a hydrocarbyl radical, or any combination thereof.

In an embodiment, the hydrocarbyl radical is independently selected from methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl. Also included are isomers of saturated, partially unsaturated, and aromatic cyclic structures wherein the radical may additionally be subjected to the types of substitutions described above. Examples include phenyl, methylphenyl, benzyl, methylbenzyl, naphthyl, cyclohexyl, cyclohexenyl, methylcyclohexyl, and the like. For this disclosure, when a radical is listed, it indicates that radical type and all other radicals formed when that radical type is subjected to the substitutions defined above. Alkyl, alkenyl, and alkynyl radicals listed include all isomers including, where appropriate, cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (cyclobutenyls and cyclopropenyls). Cyclic compounds having substitutions include all isomer forms, for example, methylphenyl would include ortho-methylphenyl, meta-methylphenyl, and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

The following abbreviations may be used through this specification: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, nBu is normal butyl, TMS is trimethylsilyl, TIBAL is tri-isobutylaluminum, TNOAL is triisobutyl n-octylaluminum, MAO is methylalumoxane, pMe is para-methyl, Ar* is 2,6-diisopropylaryl, Bz is benzyl, THF is tetrahydrofuran, RT is room temperature which is defined as 25° C. unless otherwise specified, and tol is toluene.

The term "polymerization zone" refers to an area or a reactor vessel where activated catalysts and monomers are contacted and a polymerization reaction takes place. When multiple reactors are used, either in series or parallel configuration, each reactor is considered a separate polymerization zone. For a multi-stage polymerization in both a batch reactor and a continuous reactor, each polymerization stage is a separate polymerization zone.

The term "continuous" refers to a system that operates without interruption or cessation. Hence, a continuous process is one where there is continuous addition to, and withdrawal of reactants and products from, the reactor system. Continuous processes can be operated in steady state, i.e., the composition of effluent remains fixed with time if the flow rate, temperature/pressure and feed composition remain invariant. For example, a continuous process to produce a polymer would be one where the reactants are continuously introduced into one or more reactors and polymer product is continuously withdrawn.

All molecular weights (Mn, Mw, and Mz) have units of g/mol. Wt % is weight percent and mol % is mole percent.

Polyethylene Blend Compostions

Accordingly, some embodiments of the present invention provide a polyethylene blend composition, comprising: (i) 99.0 wt % or less of a linear polyethylene having a density of at least 0.910 g/cm$^3$; and (ii) at least 1.0 wt % of a polyethylene/polystyrene graft copolymer comprising from about 70 wt % to about 98 wt % polyethylene and from about 2 wt % to about 30 wt % polystyrene. The blend composition may include about 1 wt % to about 20 wt % of the graft copolymer, or about 5 wt % to about 20 wt %, or about 10 wt % to about 20 wt %, or about 5 wt % to about 15 wt % or about 5 wt % to about 10 wt % of the graft copolymer, based on a total weight of the blend composition. The blend composition may also include about 1 wt % to about 20 wt % of the linear polyethylene, or about 5 wt % to about 20 wt %, or about 10 wt % to about 20 wt %, or about 5 wt % to about 15 wt % or about 5 wt % to about 10 wt % of the linear polyethylene, based on a total weight of the blend composition. The linear polyethylene and the polyethylene/polystyrene graft copolymers are discussed in more detail below.

The blend composition may optionally include one or more polymer additives, such as reinforcing and non-reinforcing fillers, scratch resistant agents, plasticizers, antioxidants, heat stabilizers, extender oils, lubricants, antiblocking agents, antistatic agents, anti-fogging agent, waxes, foaming agents, pigments, flame/fire retardants, dyes and colorants, and ultraviolet absorber. Other additives include, for example, blowing agents, vulcanizing or curative agents, vulcanizing or curative accelerators, cure retarders, processing aids, tackifying resins, and other processing aids known in the polymer compounding art. The lists described herein are not intended to be inclusive of all types of additives which may be employed with the present invention. Upon reading this disclosure, those of skilled in the art will appreciate other additives may be employed to enhance properties. As is understood by the skilled in the art, the blends of the present invention may be modified to adjust the characteristics of the blends as desired. The aforementioned additives may be either added independently or incorporated into an additive masterbatch. Such additives may comprise up to about 70 wt %, more preferably up to about 65 wt %, of the total composition.

The blend compositions may also include one or more slip agents or mold-release agents to facilitate moldability, preferably present at 50 ppm to 5000 ppm, preferably 0.01 wt % to 0.5 wt % (100 ppm to 5000 ppm), preferably 0.1 wt % to 0.3 wt % (1000 ppm to 3000 ppm), based upon the weight of the composition. Desirable slip additives include but are not limited to saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones and cured silicones); sodium alkylsulfates, alkyl phosphoric acid esters; stearates (such as zinc stearate); and mixtures thereof. Preferred slip additives are unsaturated fatty acid amides, which are available from Crompton (Kekamide™ grades) and Croda Universal (Crodamide™ grades). Particularly preferred are the erucamide and oleamide versions of unsaturated fatty acid amides. Preferred slip agents also include amides having the chemical structure $CH_3(CH_2)_7CH=CH(CH_2)_xCONH_2$ where x is 5 to 15. Particularly preferred amides include: 1) Erucamide $CH_3(CH_2)_7CH=CH(CH_2)_{11}CONH_2$ which may also be referred to as cis-13-docosenoamide (Erucamide is commercially available from Akzo Nobel Amides Co. Ltd. under the trade name ARMOSLIP E); 2) Oleylamide $CH_3(CH_2)_7CH=CH(CH_2)_8CONH_2$; and 3) Oleamide which may also be preferred to as N-9-octadecenyl-hexadecanamide $CH_3(CH_2)_7CH=CH(CH_2)_7CONH_2$. In another embodiment, stearamide is also useful in this invention. Other preferred slip additives include those described in WO 2004/005601 A1.

The blend compositions may also include one or more additional polymers. Suitable polymers include one or more thermoplastic resins or thermoplastic elastomers. Exemplary thermoplastic resins include crystalline polyolefins, such as polypropylene and impact copolymers. Also, suitable thermoplastic resins may include copolymers of polyolefins with styrene, such as a styrene/ethylene copolymer. In one or more embodiments, the thermoplastic resins are formed by polymerizing ethylene or alpha-olefins, such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another alpha-olefin, such as 1-butene, 1-hexene, 1-octene, 2-methyl-1-propene, 3-methyl-1-pentene, 4-methyl-1-pentene, 5-methyl-1-hexene, or mixtures thereof, are also contemplated. Specifically included are the homopolypropylene, impact, and random copolymers of propylene with ethylene or the higher alpha-olefins. Preferably, the homopolypropylene has a melting point of at least 130° C., for example at least 140° C. and preferably less than or equal to 170° C., a heat of fusion of at least 75 J/g, alternatively at least 80 J/g, as determined by DSC analysis, and weight average molecular weight ($M_w$) of at least 50,000, alternatively at least 100,000 g/mol. Comonomer contents for these propylene copolymers will typically be from about 1% to about 30% by weight of the polymer (See, for example, U.S. Pat. Nos. 6,268,438; 6,288,171; and 6,245,856). Copolymers available under the trade name VISTAMAXX™ (ExxonMobil, Houston, Tex.) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art, such as, but not limited to, the conventional Ziegler-Natta type polymerizations, and catalysis employing single-site organometallic catalysts including, but not limited to, metallocene catalysts.

Linear Polyethylene

The linear polyethylene has a density of at least 0.910 g/cm$^3$. In a preferred embodiment, the linear polyethylene has a density of 0.940 g/cm$^3$ or more. In preferred embodiments, the density is in the range of from about 0.910 g/cm$^3$ to 0.98 g/cm$^3$ (preferably from 0.915 g/cm$^3$ to 0.96 g/cm$^3$, preferably from 0.915 g/cm$^3$ to 0.950 g/cm$^3$).

In some embodiments, the linear polyethylene is an LLDPE or an HDPE. The linear polyethylene may be produced either with conventional Ziegler-Natta catalysts or with metallocene catalysts.

In a preferred embodiment, the linear polyethylene is a metallocene polyethylene (mPE). The mPE homopolymers or mPE copolymers (such as mLLDPE) may be produced using mono- or bis-cyclopentadienyl transition metal catalysts or other metallocene catalysts in combination with an activator of alumoxane and/or a non-coordinating anion in solution, slurry, high pressure, or gas phase. The catalyst and activator may be supported or unsupported and the cyclopentadienyl rings may be substituted or unsubstituted. The mPE polymers, particularly mLLDPE copolymers, can include those containing a small amount of long chain branching (LCB), for example below 5 wt %. Accordingly, in embodiments herein, the linear polyethylene may have less than 5 wt % long chain branching. Several commercial products produced with such catalyst/activator combinations are commercially available from ExxonMobil Chemical Company in Baytown, Tex. under the tradenames EXCEED™ and ENABLE™.

The polyethylene may be a metallocene LLDPE (mLLDPE), preferably present at 0.5 wt % to 99 wt % of an mLLDPE, more preferably 50 wt % to 99 wt %, more preferably 90 wt % to 99 wt %, based upon the weight of the composition.

The linear polyethylene may also be a polymer of an ethylene and at least one alpha-olefin. The alpha-olefin has 3 to 40 carbon atoms, more preferably 5 to 20 carbon atoms and most preferably 5 to 10 carbon atoms. Preferred mLLDPEs are copolymers comprising at least 50 wt % ethylene and having up to 50 wt %, preferably 1 wt % to 35 wt %, even more preferably 1 wt % to 6 wt % of a $C_3$-$C_{40}$ comonomer (e.g., $C_4$, $C_6$, $C_8$), based upon the weight of the copolymer. Preferred comonomers are butene, hexane, octane and decene.

The polyethylene copolymers preferably have an $M_w/M_n$ of from greater than 1 to 10, preferably from 1.5 to 8, preferably 2 to 7, preferably from 2 to 5. In a preferred embodiment, the $M_w/M_n$ is from 2.5 to 5.5.

In embodiments herein, the linear polyethylene is an ethylene copolymer having a CDBI of 60% or more. The polyethylene copolymers preferably have a composition distribution breadth index (CDBI) of 60% to 85%, preferably 65% to 85%. In another preferred embodiment the ethylene copolymer has a density of 0.910 g/cm³ to 0.935 g/cm³ and a CDBI of 60% to 85% or more, preferably between 65% and 85%. Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight ($M_w$) below 15,000 g/mol are ignored when determining CDBI. For purposes of this invention, a homopolymer is defined to have a CDBI of 100%.

In some embodiments, the linear polyethylene has an $M_w$ of 50,000 g/mol or more, a g' of 0.95 or more, and an $M_w/M_n$ of from greater than about 1 to about 10, and comprises from 50 mol % to 100 mol % ethylene and from 0 mol % to 50 mol % of $C_3$ to $C_{40}$ comonomer. In a preferred embodiment, the linear polyethylene is a polymer having a density of 0.910 g/cm³ or more; an $M_w$ of 50,000 g/mol or more (preferably 75,000 g/mol or more, preferably 100,000 g/mol or more); a g' of 0.95 or more (preferably 0.98 or more, preferably 0.99 or more, preferably 1.0); an $M_w/M_n$ of greater than 1 to 10 (preferably from 1.5 to 8, preferably 2 to 5); and comprises from 50 mol % to 100 mol % ethylene (preferably 65 mol % to 99 mol %, preferably 80 mol % to 97 mol %, preferably 90 mol % to 97 mol %), and from 0 mol % to 50 mol % (preferably from 1 mol % to 35 mol %, preferably 3 mol % to 20 mol %, preferably 3 mol % to 10 mol %) of $C_3$ to $C_{40}$ comonomer (preferably $C_3$ to $C_{20}$ alpha-olefin, preferably a $C_5$ to $C_{20}$ alpha-olefin, preferably propylene, butene, pentene, hexene, or octene). Particularly useful linear polyethylenes are those described in U.S. Pat. No. 6,255,426.

The polymer can be obtained by a continuous gas phase polymerization using supported catalyst of an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL) and the like).

In some embodiments, the linear polyethylene is a polymer of an ethylene and at least one alpha-olefin having 5 to 20 carbon atoms, where the linear polyethylene has a melt index, MI, (ASTM D 1238, 190° C./2.16 kg) of from 0.1 to 15 (preferably 0.3 to 10); a CDBI of at least 70% (preferably at least 75%), a density of from 0.910 to 0.930 g/cm³ (ASTM 1505, preferably from 0.915 to 0.927 g/cm³); a haze value (ASTM D 1003) of less than 20 (preferably less than 20 when formed into a film, 0.25 to 70 mils thick); a melt index ratio (MIR, ASTM D 1238 I21/I2) of from 35 to 80; an averaged modulus (M) of from 20,000 to 60,000 psi (137.9 MPa to 413.7 MPa) and a relation between M and the dart impact strength, DIS, (determined by ASTM D 1709, 26 inch, tested on a film of 0.25 mm or less) in g/mil complying with the formula:

$$DIS \geq 0.8[100 + \exp(11.71 - 0.000268M + 2.183 \times 10^{-9}M^2)]$$

where M is the averaged modulus, as further described in U.S. Pat. No. 6,255,426, the contents of which are incorporated in their entirety, including columns 7, line 5 through column 10, line 63. The averaged modulus (M) is the sum of the 1% secant modulus (ASTM D 882) in the machine direction and the transverse direction divided by two. In a preferred embodiment, the DIS is from 120 to 1000 g/mil, preferably 150 to 800 g/mil. Preferably, DIS is determined on a film 0.25 to 7 mil thick. Such polyethylenes are further described in U.S. Pat. No. 6,255,426 which is incorporated by reference herein, including the testing procedure described or cited therein.

Alkene Terminated Polystyrene Copolymers

Polyolefin/polystyrene graft copolymers are derived from alkene terminated polystyrene copolymers (preferably vinyl terminated polystyrene copolymers) and an alpha-olefin, preferably, ethylene or polyethylene. Accordingly, the alkene terminated polystyrene copolymers act as macromonomers. A vinyl terminated polystyrene copolymer (VTPS) has a vinyl group at or near the end of a polystyrene (PS) block. The placement of this vinyl group is due to the cross metathesis of a styrenic block copolymer (SBC) comprising butadiene and ethylene. This cross metathesis reaction may be referred to as a "metathesis depolymerization of SBC". Other olefin monomers (in place of ethylene) or their mixtures (including mixtures with ethylene) can be used.

Accordingly, some embodiments of the present invention relate to methods for producing an alkene terminated polystyrene, comprising: contacting a styrenic block copolymer and an alkene in the presence of a metathesis catalyst under conditions sufficient to produce an alkene terminated polystyrene having an unsaturation functionality of at least 0.7 and a MWD of about 1.5 or less. The "unsaturation functionality" (f) is determined for an alkene-terminated polystyrene as follows:

$$f = (Mn(\text{ATPS})/104) \times W(\text{moles of styrene/moles of alkene unsaturation in ATPS});$$

where ATPS is alkene terminated polystyrene, and W is a measure of the degree of unsaturation, as defined below.

Mn(ATPS) is the number average molecular weight of the alkene-terminated polystyrene as determined by GPC-DRI relative to polystyrene standards.

W is determined using $^1$H NMR spectroscopy as follows. For a $^1$H NMR spectrum of alkene-terminated polystyrene acquired in a D2-tetrachloroethane solution referenced to 5.98 ppm, W=[(integrated intensity of region from about 4.8-5.6 ppm)/2]/[(integrated intensity of region from about 6.1 to 7.3)/5].

In embodiments of this invention, where the ATPS comprises vinyl chain ends, the unsaturation functionality is calculated based on the vinyl groups, as follows:

$$f = (Mn \text{ VTPS}/104) \times W,$$

where
VTPS is vinyl terminated polystyrene; and
W is the degree of unsaturation, and is calculated as follows:

$$W = [(\text{integrated intensity of region from about 4.8-5.1 ppm})/2]/[(\text{integrated intensity of region from about 6.1 to 7.3})/5].$$

In some embodiments, the alkene terminated polystyrene is a vinyl terminated polystyrene and the alkene is ethylene. Vinylidene and vinylene terminated polystyrene copolymers are also within the scope of the present invention. The relative reactivity of these alkene termini may determine their utility for various applications.

In some embodiments, the styrenic block copolymer comprises butadiene blocks. Suitable styrenic block copolymers include a styrene-butadiene diblock, a styrene-butadiene-styrene triblock, a styrene-butadiene multiblock, a styrene-butadiene star block represented by the formula $(SB)_n$, where S represents a styrenic block, B represents a butadiene block, and n is the number of arms, and blends thereof, and the like. In preferred embodiments, the styrenic block copolymer is a styrene-butadiene-styrene triblock copolymer or blends thereof. In preferred embodiments, the butadiene block is derived essentially from 1,4-butadiene. Useful commercial styrenic block copolymers include VECTOR™ 6241A, available from Dexco Polymers (Houston, Tex.).

Any suitable catalyst for the metathesis depolymerization of the styrenic block copolymer can be used. In some embodiments herein, the catalyst comprises at least one of group 6 and/or group 8 metals. In particular embodiments, the metathesis catalyst comprises one or more of ruthenium, tungsten, and molybdenum. In preferred embodiments, the metathesis catalyst comprises ruthenium.

In particular embodiments of the present invention, the metathesis catalyst is represented by the Formula (A):

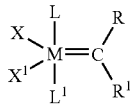

Formula (A)

wherein:
M is a Group 8 metal, preferably Ru or Os, preferably Ru;
X and $X^1$ are, independently, any anionic ligand, preferably a halogen (preferably Cl), an alkoxide or a triflate, or X and $X^1$ may be joined to form a dianionic group and may form single ring of up to 30 non-hydrogen atoms or a multinuclear ring system of up to 30 non-hydrogen atoms;
L and $L^1$ are, independently, a neutral two electron donor, preferably a phosphine, a cyclic alkyl amino carbene, or a N-heterocyclic carbene, L and $L^1$ may be joined to form a single ring of up to 30 non-hydrogen atoms or a multinuclear ring system of up to 30 non-hydrogen atoms;
L and X may be joined to form a multidentate monoanionic group and may form single ring of up to 30 non-hydrogen atoms or a multinuclear ring system of up to 30 non-hydrogen atoms;
$L^1$ and $X^1$ may be joined to form a multidentate monoanionic group and may form single ring of up to 30 non-hydrogen atoms or a multinuclear ring system of up to 30 non-hydrogen atoms;
R and $R^1$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);
$R^1$ and $L^1$ or $X^1$ may be joined to form single ring of up to 30 non-hydrogen atoms or a multinuclear ring system of up to 30 non-hydrogen atoms; and
R and L or X may be joined to form single ring of up to 30 non-hydrogen atoms or a multinuclear ring system of up to 30 non-hydrogen atoms.

In preferred embodiments of this invention, the metathesis catalyst is one or more of: 2,6-diisopropylphenylimidoneophylidene molybdenum(VI) bis(t-butoxide), 2,6-diisopropylphenylimidoneophylidene molybdenum(VI) bis(hexafluoro-t-butoxide), 2,6-diisopropylphenylimido neophylidenemolybdenum(VI) bis(trifluoromethanesulfonate)dimethoxyethane adduct, 2,6-diisopropylphenylimidoneophylidene[racemic-BIPHEN]molybdenum(VI), tricyclohexylphosphine[1,3-bis(2,4,6-trimethylphenyl)imidazol-2-ylidene][3-phenyl-1H-inden-1-ylidene]ruthenium (II) dichloride, tricyclohexylphosphine[3-phenyl-1H-inden-1-ylidene][1,3-bis(2,4,6-trimethylphenyl)-4,5-dihydroimidazol-2-ylidene]ruthenium(II) dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride, [1,3-bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-bis-(2,4,6-trimethylphenyl)-2-imidazolidinylidene)dichloro(o-isopropoxyphenylmethylene)ruthenium, 1,3-bis(2-methylphenyl)-2-imidazolidinylidene]dichloro(2-isopropoxyphenylmethylene)ruthenium(II), [1,3-bis(2,4,6-trimethylphenyl)-2-imidazolidinylidene]dichloro[3-(2-pyridinyl)propylidene]ruthenium(II), [1,3-bis(2-methylphenyl)-2-imidazolidinylidene]dichloro(phenylmethylene) (tricyclohexylphosphine)ruthenium(II), [1,3-bis(2,4,6-trimethylphenyl)-2-imidazolidinylidene]dichloro(3-methyl-2-butenylidene) (tricyclohexylphosphine)ruthenium(II), and [1,3-bis(2,4,6-trimethylphenyl)-2-imidazolidinylidene]dichloro(benzylidene)bis(3-bromopyridine)ruthenium(II).

In more preferred embodiments, the metathesis catalyst is represented by one or more of the following N-heterocyclic carbene or cyclic alkyl amino carbene structures:

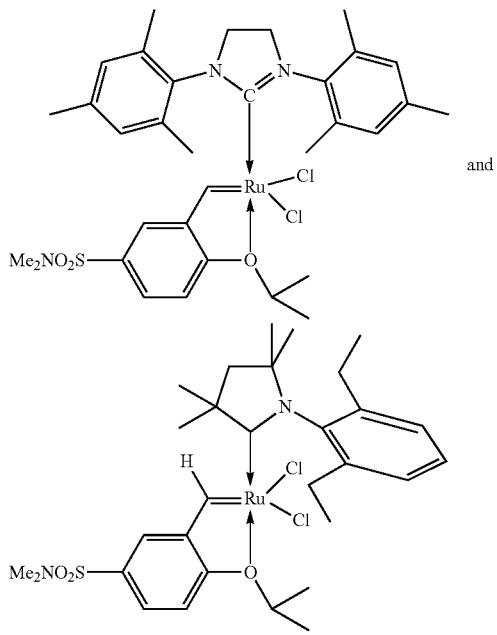

wherein Me is methyl.

The styrenic block copolymer (SBC) is anionically polymerized, and it therefore has monodisperse molecular weight and no or minimal homopolymeric impurities. Accordingly, the resulting VTPS will have a high vinyl functionality (f), a molecular weight very close to that of the single PS block of the precursor styrenic block copolymer, and a very narrow molecular weight distribution (MWD=$M_w/M_n$). Besides its use as the side-chain macromolecule of a graft copolymer, this VTPS can be utilized as a macromonomer or as a functional polymer for further polymerizations or reactions to make useful polymeric materials in other applications.

The VTPS has an unsaturation functionality (f) of at least 0.7 (preferably, at least 0.75, at least 0.80, at least 0.85, at least 0.90, or at least 0.95) and a MWD of about 1.5 or less (preferably MWD of about 1.2 or less).

The weight average molecular weight ($M_w$) of the VTPS is within preferably 15% of the $M_w$ of a single styrenic block of the precursor SBS, where the precursor SBS is the SBS before metathesis. Preferably the difference between the $M_w$ of the VTPS and the $M_w$ of a single styrenic block of the precursor SBS is about 2% to 10%. The $M_w$ of the VTPS is less than 200,000, preferably less than 100,000, or preferably less than 50,000.

Polyolefin/Styrene Graft Copolymers

Polyolefin/styrene graft copolymers are discussed herein. Preferably, the graft copolymer is a polyethylene grafted with a vinyl terminated polystyrene (VTPS). The VTPS is described above.

Accordingly, some embodiments of the present invention relate to methods for producing a functionalized polymer, comprising: contacting a styrenic block copolymer and alpha olefin monomer (preferably ethylene) in the presence of a metathesis catalyst under conditions sufficient to produce a vinyl terminated polystyrene having a functionality of at least 0.7 and a MWD of about 1.5 or less; and grafting the vinyl terminated polystyrene to a polyolefin (preferably polyethylene) to form a polyolefin/polystyrene graft copolymer (preferably polyethylene/polystyrene graft copolymer).

In other embodiments, the vinyl terminated polystyrene can contact with a vinyl terminated polyolefin in the presence of a catalyst comprising one or more group 6 and/or group 8 metals (preferably ruthenium, tungsten, and/or molybdenum) at conditions sufficient to produce a copolymer composition comprising at least 40 wt % of a diblock copolymer of polystyrene and polyolefin, based on the total weight of the copolymer composition. Diblock copolymer means having one mer unit derived from the vinyl terminated polystyrene and another mer unit derived from the polyolefin in the same molecule. In such embodiments, the vinyl terminated polystyrene may be grafted to the polyolefin, for example, polyethylene, by reactive blending in the presence of at least one organic peroxide. The VTPS can also react with a vinyl terminated amorphous polypropylene in the presence of a catalyst containing ruthenium, tungsten, or molybdenum at conditions (for example, both polymers dissolved in toluene, reaction performed in an inert atmosphere) sufficient to produce at least 40 wt % of a diblock copolymer of polystyrene and polypropylene. If the polyolefin in the diblock copolymer is a polypropylene, this diblock can be used as a modifier for another homopolymer or copolymer of propylene or as a compatibilizer for the blend of a homopolymer or copolymer of propylene and a styrenic polymer or copolymer.

The reactive blending may take place in a mixer, for example a batch mixer (BRABENDER™ mixer, two roll mill, etc.) or a continuous mixer (single screw extruder, twin screw extruder, etc.) to form the polyolefin/polystyrene graft copolymer. This reactive blending, also referred to as peroxide grafting, is discussed below.

The polyolefin/polystyrene graft copolymer may also be produced by using a suitable metallocene catalyst to copolymerize alpha olefin monomer with the VTPS. Preferably, a PE/PS graft copolymer is produced. Preferably, by using a suitable metallocene catalyst to copolymerize ethylene monomer with the VTPS. The polyolefin/polystyrene graft copolymer can also be produced by the "in-reactor polymer blend" approach. As used herein the term "in-reactor polymer blend," also known as an "intimate blend," refers to a mixture of polymers produced in one or more polymerization zones in the same polymerization process/system without the need for post polymerization blending or reaction (although the resultant copolymer can undergo post polymerization blending, for example, to incorporate additives, etc.). In other words, the metathesis depolymerization of SBC and the copolymerization of alpha olefin (for example, ethylene) and the resulting VTPS are performed sequentially in the same polymerization process/system. Each polymer component in the mixture possesses a unique molecular structure at different times, such as the SBC, the VTPS macromonomer, the propagating polyethylene chain initiated by a metallocene catalyst in the presence of a methylalumoxane coinitiator (activator), and the final PE/PS graft copolymer. The metallocene catalyzed polymerization to produce a polyolefin/polystyrene graft polymer is discussed further below.

The resulting polyolefin/polystyrene graft copolymer (preferably, PE-g-PS) by any of the methods described can be added as a styrenic modifier to polyolefin to improve its physical properties. In preferred embodiments, PE-g-PS can be added as a modifier to polyethylene, particularly linear polyethylene, to improve its melt elasticity and processability. The terms "polyethylene" and "ethylene polymer" are used interchangeably.

Polyolefin/Polystyrene Graft Copolymer by Peroxide Grafting

A particularly preferred process for preparing the polyolefin/polystyrene graft copolymer (preferably PE-g-PS) includes melt blending polyolefin (preferably PE) and VTPS in the substantial absence of a solvent, with a free radical generating catalyst, such as a peroxide catalyst in a shear-imparting reactor, such as an extruder reactor. One or more single screw and/or multiple screw reactors may be used, preferably twin screw extruder reactors such as co-rotating intermeshing extruders, counter-rotating non-intermeshing extruders, and/or co-kneaders such as those sold by Buss Inc., USA (Carol Stream, Ill.) are especially preferred.

To provide the polyolefin/polystyrene graft copolymer (preferably PE/PS graft copolymer) by peroxide grafting, the polyethylene and the VTPS can be combined into an intimate mixture using conventional blending equipment and methods used in the elastomer industry. Suitable equipment includes batch mixers, internal mixers (such as BANBURY™ mixers, commercially available from Farrel Corporation, Ansonia, Conn.), roll-mills, kneaders, extruders (including combinations of a compounding extruder and a side-arm extruder used directly or indirectly downstream of a polymerization process), static mixers, impingement mixers, and combinations thereof. The components can be first "dry-blended" such as in a tumble-blender and subsequently melt-blended in the blending equipment, or can be combined by direct addition individually into the blending equipment.

Useful organic peroxides include but are not limited to: diaryl peroxides, ketone peroxides, peroxydicarbonates, peroxyesters, dialkyl peroxides, hydroperoxides, benzoyl peroxides, lauroyl peroxides, di-t-butyl peroxide, dicumyl peroxide, t-butylcumyl peroxide, t-butyl peroctoate, p-di(t-butylperoxy)diisopropylbenzene, 2,5-dimethyl-2,5-di(t-butylperoxy)hexane, 1,1-di(t-butylperoxy)-3,3,5-trimethylcyclohexane, 2,5-dimethyl-2,5-di(t-butylperoxy)hexene-3, t-butyl-peroxy-(cis-3-carboxy)propenoate, 1,1-di(t-amylperoxy)cyclohexane, t-amyl-(2-ethylhexyl)peroxycarbonate, t-butylperoxy-3,5,5-trimethylhexanoate, t-butyl peroxybenzoate, and mixtures thereof. Peroxides having a 1 minute half-life at temperatures of less than 200° C. (preferably less than 185° C., preferably less than 170° C.) are preferred. Blends of peroxides having different activation temperatures can be utilized to more precisely control the grafting process. Peroxides are available from a variety of commercial suppliers, including LUPEROX™ from Arkema (France), TRIGONOX™ and PERKADOX™ from Akzo Nobel (Netherlands), and VAROX™ from R.T. Vanderbilt (Norwalk, Conn.), either as a liquid product, a solid product or as a concentrated assay on an inorganic support.

In preferred embodiments, the organic peroxide is dicumyl peroxide. A preferred sequence of events used for the grafting reaction comprises the steps of melting the polymers, introducing the peroxide catalyst, and venting the unreacted monomer and by-products resulting from the peroxide decomposition.

The grafting reaction is preferably carried out at a temperature selected to minimize or avoid rapid vaporization and consequent losses of the peroxide catalyst and to have residence times about 6 to 7 times the half life time of the peroxide. A temperature profile where the temperature of the polymer melt increases gradually through the length of the extruder up to a maximum in the grafting reaction zone of the reactor, and then decreases toward the reactor output, is preferred. Temperature attenuation in the last sections of the extruder is desirable for product pelletizing purposes. The polyethylene is preferably grafted with the VTPS at high temperature. Suitable temperatures range from a low of about 50° C. to a high of about 350° C. The temperature can also range from a low of about 75° C., 100° C., or 125° C., to a high of about 200° C., 250° C., or 300° C.

In order to optimize the consistency of feeding, the peroxide can be dissolved at an approximate 10% concentration in a mineral oil whereas the polyolefin (preferably PE) and the VTPS are preferably fed neat.

The peroxide catalyst is preferably used in a ratio of from 0.00001 wt % to 100 wt %, more preferably from 0.1 wt % to 10 wt %, based on the weight of the VTPS.

Polyolefin/Polystyrene Graft Copolymer by Metallocene Copolymerization

The polyolefin/polystyrene graft copolymer (for example, PE-g-PS) can also be produced using any appropriate polymerization techniques known in the art. Polymerization methods include high pressure, slurry, gas, bulk, suspension, supercritical, or solution phase, or a combination thereof, using a single-site metallocene catalyst system. The catalysts can be in the form of a homogeneous solution, supported, or a combination thereof. Polymerization may be carried out by a continuous, a semi-continuous or batch process and may include use of chain transfer agents, scavengers, or other such additives as deemed applicable.

The in-reactor blend compositions can be produced in a single reaction vessel or zone with at least two catalysts, which are added at two different times. The catalyst capable of performing metathesis depolymerization of SBC based on butadiene is added first to this SBC dissolved in a suitable solvent in the reaction zone to produce the VTPS in the presence of alkene, preferably ethylene. After the metathesis reaction is completed, at least one metallocene catalyst together with a methylalumoxane (MAO) activator is added. Copolymerization of alkene monomer (preferably ethylene) with VTPS is carried out to produce the polyolefin/polystyrene (preferably PE/PS graft copolymer). Methylalumoxane deactivates the metathesis catalyst after the VTPS is produced. The remaining methylalumoxane acts as an activator for the metallocene catalyst(s) to copolymerize the alkene with the VTPS. The metathesis and metallocene catalysts can be fed into the reaction zone as a homogeneous catalyst solution through separated feed lines. The metathesis and/or metallocene catalyst(s) can be also supported on a support material.

The polyolefin/polystyrene graft copolymer (for example, PE-g-PS) can be produced in a single reaction zone with at least one catalyst to copolymerize alpha olefin monomer (for example, ethylene) with VTPS. The catalyst(s) can be fed into the reactor as a homogeneous catalyst solution through separated feed lines. The catalyst(s) for copolymerization can be also supported on a support material.

Metallocene Catalysts

A metallocene catalyst system is preferred to copolymerize the ethylene monomer with the VTPS macromonomer to produce the polyethylene/polystyrene graft copolymer. Suitable metallocene precatalysts are those selected from formulas (I), (II), (III), and (IVa) (described below) which when used with suitable activators, are capable of producing a polyethylene at commercially attractive temperatures of from about 50° C. to about 150° C. Two or more metallocene catalysts can be selected which produce polymers having different molecular weights. This results in a broader molecular weight distribution.

Metallocene catalyst compounds are generally described throughout in, for example, METALLOCENE-BASED POLYOLEFINS, Vol. 1 & 2 (John Scheirs & W. Kaminsky eds., John Wiley & Sons, 2000); G. G. Hlalky in COORDINATION CHEM. REV. Vol. 181, pp. 243-296, 1999 and in particular, for use in the synthesis of polyethylene in METALLOCENE-BASED POLYOLEFINS, Vol. 1, pp. 261-377, 2000. The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components" or "metallocene catalysts" or "metallocene pre-catalysts" or "pre-catalysts".

The Cp ligands are typically π-bonded and/or fused ring(s) or ring systems. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron, aluminum, and combinations thereof, wherein carbon makes up at least 50% of the ring members. Even more particularly, the Cp ligand(s) may be selected from the group consisting of substituted and unsubstituted cyclopentadienyl ligands and ligands isolobal to cyclopentadienyl, non-limiting examples of which include cyclopentadienyl, indenyl, fluorenyl, and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, partially hydrogenated versions thereof (e.g., 4,5,6,7-tetrahydroindenyl, or "H$_4$Ind", where Ind means indenyl), substituted versions thereof, and heterocyclic versions thereof. In a particular embodiment, the metallocenes useful in the present invention may be selected from those including one or two (two, in a more particular embodiment), of the same or different Cp rings selected from the group consisting of cyclopentadienyl, indenyl, fluorenyl, tetrahydroindenyl, and substituted versions thereof.

The metal atom "M" of the metallocene catalyst compound, as described throughout the specification and claims, may be selected from the group consisting of groups 3 through 12 atoms and lanthanide group atoms in one embodiment; and selected from the group consisting of groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of groups 4, 5, and 6 atoms in yet a more particular embodiment, and from Ti, Zr, Hf atoms in yet a more particular embodiment, and may be Zr in yet a more particular embodiment. The oxidation state of the metal atom "M" may be in the range from 0 to +7 in one embodiment; and in a more particular embodiment, is +1, +2, +3, +4, or +5; and in yet a more particular embodiment is +2, +3, or +4. The groups bound to the metal atom "M" are such that the compounds described below in the formulas and structures are electrically neutral, unless otherwise indicated. The Cp ligand(s) form at least one chemical bond with the metal atom "M" to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I): $Cp^A Cp^B MX_n$ wherein M is as described above; each X is chemically bonded to M; each Cp group is chemically bonded to M; and n is 0, 1, 2, 3, or 4, and either 1 or 2 in a particular embodiment. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each. Independently, each $Cp^A$ and $Cp^B$ of formula (I) may be unsubstituted or substituted with any one or combination of substituent groups R. Non-limiting examples of substituent groups R as used in formula (I) as well as ring substituents in formulas (II), (III) and (IVa) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl and aryl substituent groups R associated with formula (I) through (IVa) include methyl, ethyl, propyl, butyl, pentyl, hexyl, cyclopentyl, cyclohexyl, benzyl, phenyl, methylphenyl, tert-butylphenyl groups, and the like, including all their isomers, for example tertiary-butyl, isopropyl, and the like. Other possible radicals include substituted alkyls and aryls, such as, for example, fluoromethyl, fluoroethyl, difluoroethyl, iodopropyl, bromohexyl, chlorobenzyl, and hydrocarbyl substituted organometalloid radicals including trimethylsilyl, trimethylgermyl, methyldiethylsilyl, and the like; halocarbyl-substituted organometalloid radicals including tris(trifluoromethyl)silyl, methylbis(difluoromethyl)silyl, bromomethyldimethylgermyl, and the like; disubstituted boron radicals including dimethylboron, for example; and disubstituted group 15 radicals including dimethylamine, dimethylphosphine, diphenylamine, methylphenylphosphine, group 16 radicals including methoxy, ethoxy, propoxy, phenoxy, methylsulfide, and ethylsulfide. Other substituents R include olefins, such as, but not limited to, olefinically-unsaturated substituents including vinyl terminated ligands, for example 3-butenyl, 2-propenyl, 5-hexenyl, and the like. In one embodiment, at least two R groups (two adjacent R groups in one embodiment) are joined to form a ring structure having from 3 to 30 atoms selected from the group consisting of carbon, nitrogen, oxygen, phosphorous, silicon, germanium, aluminum, boron, and combinations thereof. Also, a substituent group R group, such as 1-butanyl, may form a bonding association to the element M.

Non-limiting examples of X groups include alkyls, amines, phosphines, ethers, carboxylates, dienes, hydrocarbon radicals having from 1 to 20 carbon atoms; fluorinated hydrocarbon radicals (e.g., —$C_6F_5$ (pentafluorophenyl)), fluorinated alkylcarboxylates (e.g., $CF_3C(O)O$—), hydrides and halogen ions (such as chloride or bromide) and combinations thereof. Other examples of X ligands include groups, such as cyclobutyl, cyclohexyl, methyl, heptyl, tolyl, trifluoromethyl, tetramethylene, pentamethylene, methylidene, methoxy, ethoxy, propoxy, phenoxy, bis(N-methylanilide), dimethylamide, dimethylphosphide radicals, and the like. In one embodiment, two or more X's form a part of a fused ring or ring system.

In another aspect of the invention, the metallocene catalyst component includes those of formula (I) where $Cp^A$ and $Cp^B$ are bridged to each other by at least one bridging group, (A), such that the structure is represented by formula (II): $Cp^A(A)Cp^B MX_n$. These bridged compounds represented by formula (II) are known as "bridged metallocenes". $Cp^A$, $Cp^B$, M, X, and n in formula (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as, but not limited to, at least one of a carbon, oxygen, nitrogen, silicon, aluminum, boron, germanium, tin atom, and combinations thereof; wherein the heteroatom also may be $C_1$ to $C_{12}$ alkyl or aryl substituted to satisfy neutral valency. The bridging group (A) also may contain iron or substituent groups R as defined above (for formula (I)) including halogen radicals. More particular non-limiting examples of bridging group (A) are represented by $C_1$ to $C_6$ alkylenes, substituted $C_1$ to $C_6$ alkylenes, oxygen, sulfur, $R'_2C$=, $R'_2Si$=, —$Si(R')_2Si(R'_2)$—, $R'_2Ge$=, $R'P$= (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted group 15 atoms, substituted group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl, and the corresponding moieties wherein the Si atom is replaced by a Ge or a C atom, dimethylmethylidene (or isopropylidene), dimethylidene, dimethylgermyl, and diethylgermyl.

In another embodiment, bridging group (A) also may be cyclic. The cyclic bridging groups (A) may be saturated or unsaturated and/or may carry one or more substituents and/or may be fused to one or more other ring structures.

The ligands $Cp^A$ and $Cp^B$ of formula (I) and (II) are different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene represented by the formula (III): $Cp^A(A)QMX_n$, wherein $Cp^A$ is defined above and is bound to M; (A) is a bridging group bonded to Q and $Cp^A$; and wherein an atom from the Q group is bonded to M; and n is an integer 0, 1, or 2. In formula (III) above, any of $Cp^A$, (A) and Q may form a fused ring system. The X groups and n of formula (III) are as defined above in formula (I) and (II). In one embodiment, $Cp^A$ is selected from the group consisting of cyclopentadienyl, indenyl, tetrahydroindenyl, fluorenyl, substituted versions thereof, and combinations thereof. In formula (III), Q is a heteroatom-containing ligand in which the bonding atom (the atom that is bonded with the metal M) is selected from the group consisting of group 15 atoms and group 16 atoms in one embodiment, and selected from the group consisting of nitrogen, phosphorus, oxygen, or sulfur atom in a more particular embodiment, and nitrogen and oxygen in yet a more particular embodiment. Non-limiting examples of Q groups include amides, alkoxides, alkylamides, arylamides, phosphides, alkylphosphides, arylphosphides, mercapto compounds, carboxylates (e.g., pivalate), carbamates, azenyl, azulene, phosphoryl, phosphinimine, pyrrolyl, pyrozolyl, carbazolyl, and other compounds comprising group 15 and group 16 atoms capable of bonding with M.

In yet another aspect of the invention, the at least one metallocene catalyst component may be an unbridged "half sandwich" metallocene represented by the formula (IVa):

$$Cp^AMJ_qX_n \qquad (IVa)$$

wherein $Cp^A$ is defined as for the Cp groups in (I) and is a ligand that is bonded to M; each J is independently bonded to M; X is a leaving group as described above in (I); n ranges from 0 to 3, and is 0 or 3 in one embodiment; q ranges from 0 to 3; and is 0 or 3 in one embodiment. In one embodiment, $Cp^A$ is selected from the group consisting of cyclopentadienyl, indenyl, tetrahydroindenyl, fluorenyl, substituted version thereof, and combinations thereof. In formula (IVa), J is selected from the group consisting of RC(O)O—, $R_2NC$(aryl)=N—, $R_2NC(alkyl)$=N—, $R_2C$=N—, $R_2P$=N—, —$NR_2$, —$CR_3$, —SR, —OR, —$SiR_3$, —$PR_2$, —H, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of J include $C_1$ to $C_{12}$ carbamates, $C_1$ to $C_{12}$ carboxylates (e.g., pivalate), $C_2$ to $C_{20}$ alkyls, and $C_2$ to $C_{20}$ heteroallyl moieties.

In another aspect of the invention, the metallocene catalyst component is one or more as described in U.S. Pat. Nos. 5,703,187 and 5,747,406, including a dimer or oligomeric structure, such as disclosed in, for example, U.S. Pat. Nos. 5,026,798 and 6,069,213. In another aspect of the invention, the metallocene catalyst component is one or more as described in U.S. Pat. No. 6,069,213.

It is contemplated that the metallocene catalyst components described above include their structural or optical or enantiomeric isomers (racemic mixture), and may be a pure enantiomer in one embodiment. As used herein, a single, bridged, asymmetrically substituted metallocene catalyst component having a racemic and/or meso isomer does not, itself, constitute at least two different bridged, metallocene catalyst components. The "metallocene catalyst component" useful in the present invention may comprise any combination of any embodiment described herein.

Activators

In addition to the catalyst component described above, the catalyst system employed in the present process employs an activator preferably selected from alumoxanes, such as methyl alumoxane, modified methyl alumoxane, ethyl alumoxane, iso-butyl alumoxane, and the like; neutral activators, such as triphenyl boron, tris-perfluorophenyl boron, tris-perfluoronaphthylboron, tris-perfluorophenyl aluminum, and the like; and ionic activators, such as N,N-dimethylanilinium tetrakis perfluorophenyl borate, triphenyl carbonium tetrakis perfluorophenyl borate, N,N-dimethylanilinium tetrakis perfluoronaphthyl borate, N,N-dimethylanilinium tetrakis perfluorophenyl aluminate, and the like.

A co-activator is a compound capable of alkylating the transition metal complex, such that when used in combination with an activator, an active catalyst is formed. Co-activators include alumoxanes, such as methyl alumoxane; modified alumoxanes, such as modified methyl alumoxane; and aluminum alkyls, such as trimethyl aluminum, tri-isobutyl aluminum, triethyl aluminum, and tri-isopropyl aluminum. Co-activators are typically only used in combination with neutral activators and ionic activators when the pre-catalyst is not a dihydrocarbyl or dihydride complex.

Alumoxanes

The alumoxane component useful as an activator typically is an oligomeric aluminum compound represented by the general formula $(R^x$—Al—O$)_n$, which is a cyclic compound, or $R^x(R^x$—Al—O$)_n$AlR$^x_2$, which is a linear compound. In the general alumoxane formula, $R^x$ is independently a $C_1$-$C_{20}$ alkyl radical, for example methyl, ethyl, propyl, butyl, pentyl, isomers thereof, and the like, and "n" is an integer from 1-50. Most preferably, $R^x$ is methyl and "n" is at least 4. Methyl alumoxane and modified methyl alumoxanes are most preferred. For further descriptions see, EP 0 279 586; EP 0 594 218; EP 0 561 476; WO94/10180; and U.S. Pat. Nos. 4,665,208; 4,874,734; 4,908,463; 4,924,018; 4,952,540; 4,968,827; 5,041,584; 5,091,352; 5,103,031; 5,157,137; 5,204,419; 5,206,199; 5,235,081; 5,248,801; 5,329,032; 5,391,793; and 5,416,229.

When an alumoxane or modified alumoxane is used, the pre-catalyst (all pre-catalysts)-to-activator molar ratio is from about 1:3000 to about 10:1; alternatively 1:2000 to 10:1; alternatively 1:1000 to 10:1; alternatively 1:500 to 1:1; alternatively 1:300 to 1:1; alternatively 1:200 to 1:1; alternatively 1:100 to 1:1; alternatively 1:50 to 1:1; alternatively 1:10 to 1:1. When the activator is an alumoxane (modified or unmodified), some embodiments select the maximum amount of activator at a 5000-fold molar excess over the pre-catalyst (per metal catalytic site). The preferred minimum activator-to-pre-catalyst-ratio is 1:1 molar ratio.

Non-Coordinating Anion (NCA) Activators

The term "non-coordinating anion" (NCA) means an anion that does not coordinate to the catalyst metal cation or that does coordinate to the metal cation, but only weakly. An NCA coordinates weakly enough that a neutral Lewis base, such as an olefinically or acetylenically unsaturated monomer can displace it from the catalyst center. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal complex cation in the sense of balancing its ionic charge at +1, and yet retain sufficient liability to permit displacement by an ethylenically or acetylenically unsaturated monomer during polymerization. These types of cocatalysts sometimes use scavengers, such as, but not limited to, tri-iso-butyl aluminum, tri-n-octyl aluminum, tri-n-hexyl aluminum, triethylaluminum, or trimethylaluminum.

NCA activators (at times used in combination with a coactivator) may be used in the practice of this invention. Preferably, discrete ionic activators such as $[Me_2PhNH][B(C_6F_5)_4]$, $[Ph_3C][B(C_6F_5)_4]$, $[Me_2PhNH][B(C_6H_3-3,5-(CF_3)_2)_4]$, $[Ph_3C][B(C_6H_3-3,5-(CF_3)_2)_4]$, $[NH_4][B(C_6H_5)_4]$, $[Me_2PhNH][B(C_{10}F_7)_4]$, $[Ph_3C][B(C_{10}F_7)_4]$, or neutral activators, such as $B(C_6F_5)_3$, $B(C_{10}F_7)_3$, or $B(C_6H_5)_3$ can be used (where $C_6F_5$ is perfluorophenyl, $C_{10}F_7$ is perfluoronaphthyl, and $C_6H_3-3,5-(CF_3)_2$ is 3,5-bis(trifluoromethyl)phenyl). Preferred co-activators, when used, are alumoxanes, such as methyl alumoxane, modified alumoxanes, such as modified methyl alumoxane, and aluminum alkyls, such as tri-isobutyl aluminum, and trimethyl aluminum.

It is within the scope of this invention to use one or more type of NCA activators, which may be neutral or ionic, such as tri(n-butyl)ammonium tetrakis(pentafluorophenyl)borate, a trisperfluorophenyl boron metalloid precursor, or a trisperfluoronaphthyl boron metalloid precursor, polyhalogenated heteroborane anions (WO 98/43983), boric acid (U.S. Pat. No. 5,942,459).

Examples of neutral NCA activators include tri-substituted boron, tellurium, aluminum, gallium and indium or mixtures thereof. The three substituent groups are each independently selected from alkyls, alkenyls, halogen, substituted alkyls, aryls, arylhalides, alkoxy, and halides. Preferably, the three groups are independently selected from halogen, mono or multicyclic (including halosubstituted) aryls, alkyls, and alkenyl compounds and mixtures thereof, preferred are alkenyl groups having 1-20 carbon atoms, alkyl groups having 1-20 carbon atoms, alkoxy groups having 1-20 carbon atoms and aryl groups having 3-20 carbon atoms (including substituted aryls). More preferably, the three groups are alkyls having 1-4 carbon groups, phenyl, naphthyl, or mixtures thereof. Even more preferably, the three groups are halogenated, preferably fluorinated, aryl groups. Most preferably, the neutral NCA activator is trisperfluorophenyl boron or trisperfluoronaphthyl boron.

Ionic NCA activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. Ser. No. 08/285,380, filed Aug. 3, 1994, all of which are herein fully incorporated by reference. Activated ionic catalysts can be prepared by reacting a transition metal compound (pre-catalyst) with a neutral activator, such as $B(C_6F_6)_3$, which upon reaction with the hydrolyzable ligand (X) of the transition metal compound forms an anion, such as ($[B(C_6F_5)_3$ $(X)]^-$), which stabilizes the cationic transition metal species generated by the reaction. In this case, the ionic activator reacts with the transition metal compound (pre-catalyst) to form a cationic transition metal species, an anion, and byproduct(s). The byproducts are defined by the cation associated with the ionic NCA activator used.

Compounds useful as an ionic NCA activator comprise a cation, which is preferably a Bronsted acid capable of donating a proton, and a compatible non-coordinating anion which anion is relatively large (bulky), capable of stabilizing the active catalyst species which is formed when the two compounds are combined and said anion will be sufficiently labile to be displaced by olefinic, diolefinic and acetylenically unsaturated substrates or other neutral Lewis bases, such as ethers, nitriles, and the like. Two classes of compatible non-coordinating anions have been disclosed in EP 0 277 003 A and EP 0 277 004 A, published 1988: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the ionic NCA activators include a cation and an anion component, and may be represented by the following formula:

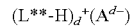

wherein $L^{}$ is a neutral Lewis base; H is hydrogen; $(L^{}-H)^+$ is a Bronsted acid; $A^{d-}$ is a non-coordinating anion having the charge d−; d is 1, 2, or 3.

The cation component, $(L^{**}-H)_d^+$ may include Bronsted acids such as protons or protonated Lewis bases or reducible Lewis acids capable of protonating or abstracting a moiety, such as an alkyl or aryl, from the pre-catalyst after alkylation.

The activating cation $(L^{}-H)_d^+$ may be a Bronsted acid, capable of donating a proton to the alkylated transition metal catalytic precursor resulting in a transition metal cation, including ammoniums, oxoniums, phosphoniums, silyliums, and mixtures thereof; preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline; phosphoniums from triethylphosphine, triphenylphosphine, and diphenylphosphine; oxomiuns from ethers, such as dimethyl ether, diethyl ether, tetrahydrofuran, and dioxane; sulfoniums from thioethers, such as diethyl thioethers and tetrahydrothiophene, and mixtures thereof. The activating cation $(L^{}-H)_d^+$ may also be a moiety, such as silver, tropylium, carbeniums, ferroceniums, and mixtures; preferably carboniums and ferroceniums; most preferably triphenyl carbonium.

The anion component $A^{d-}$ includes those having the formula $[M^{k+}Q_n]^{d-}$ wherein k is an integer from 1-3; n is an integer from 2-6; n−k=d; M is an element selected from group 13 of the Periodic Table of the Elements, preferably boron or aluminum; and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl having 1-20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Most preferably, the ionic NCA activator is N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetra(perfluorophenyl)borate.

The catalyst precursors employed in the present process can also be activated with cocatalysts or activators that comprise non-coordinating anions containing metalloid-free cyclopentadienide ions. These are described in U.S. Patent Publication 2002/0058765 A1, published on 16 May 2002, and for the instant invention, require the addition of a co-activator to the catalyst pre-cursor. The present process also can employ cocatalyst compounds or activator compounds that are initially neutral Lewis acids but form a cationic metal complex and a noncoordinating anion, or a zwitterionic complex upon reaction with the alkylated transition metal compounds. The alkylated transition metal compound is formed from the reaction of the catalyst pre-cursor and the co-activator. For example, tris(pentafluorophenyl) boron or aluminum act to abstract a hydrocarbyl ligand to yield an invention cationic transition metal complex and stabilizing noncoordinating anion, see EP 0 427 697 A and EP 0 520 732 A for illustrations of analogous group 4 metallocene compounds. Also, see the methods and compounds of EP 0 495 375 A. For formation of zwitterionic complexes using analogous Group 4 compounds, see U.S. Pat. Nos. 5,624,878; 5,486,632; and 5,527,929.

Additional neutral Lewis-acids are known in the art and are suitable for abstracting formal anionic ligands. See in particular the review article by E. Y.- X. Chen and T. J. Marks, "Cocatalysts for Metal-Catalyzed Olefin Polymerization: Activators, Activation Processes, and Structure-Activity Relationships", *Chem. Rev.*, 100, pp. 1391-1434 (2000).

When the cations of noncoordinating anion precursors are Bronsted acids, such as protons or protonated Lewis bases (excluding water), or reducible Lewis acids, such as ferrocenium or silver cations, or alkali or alkaline earth metal cations, such as those of sodium, magnesium, or lithium, the catalyst-precursor-to-activator molar ratio may be any ratio. Combinations of the described activator compounds may also be used for activation.

When an NCA activator is used, the pre-catalyst (all pre-catalysts)-to-activator molar ratio is from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; 1:1 to 1:1.2. The pre-catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1, 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; 1:10 to 2:1.

Preferred activators and activator/co-activator combinations include methylalumoxane, modified methylalumoxane, mixtures of methylalumoxane with dimethylanilinium tetrakis(pentafluorophenyl)borate or tris(pentafluorophenyl) boron, and mixtures of trimethyl aluminum or triethyl aluminum or triisobutyl aluminum or tri-n-octylaluminum with dimethylanilinium tetrakis(pentafluorophenyl)borate or tris (pentafluorophenyl)boron or dimethylanilinium tetrakis(perfluoronaphthyl)borate. Particularly preferred activator/co-activator combinations include tri-n-octylaluminum with dimethylanilinium tetrakis(pentafluorophenyl)borate, tri-n-octylaluminum with dimethylanilinium tetrakis(perfluoronaphthyl)borate, and methylalumoxane with dimethylanilinium tetrakis(pentafluorophenyl)borate.

In some embodiments, scavenging compounds are used with NCA activators. Typical aluminum or boron alkyl components useful as scavengers are represented by the general formula $R^x JZ_2$ where J is aluminum or boron, $R^x$ is a $C_1$-$C_{20}$ alkyl radical, for example, methyl, ethyl, propyl, butyl, pentyl, isomers thereof, and each Z is independently $R^x$ or a different univalent anionic ligand, such as halogen (Cl, Br, I), alkoxide ($OR^x$), and the like. Most preferred aluminum alkyls include triethylaluminum, diethylaluminum chloride, tri-isobutylaluminum, tri-n-octylaluminum. tri-n-hexylaluminum, trimethylaluminum, and the like. Preferred boron alkyls include triethylboron. Scavenging compounds may also be alumoxanes and modified alumoxanes including methylalumoxane and modified methylalumoxane.

The catalyst system useful in the present invention may further comprise a support material. Supports, methods of supporting, modifying, and activating supports for single-site catalyst, such as metallocenes, is discussed in, for example, METALLOCENE-BASED POLYOLEFINS, Vol. 1, pp. 173-218 (J. Scheirs & W. Kaminsky eds., John Wiley & Sons, 2000). Desirable carriers are inorganic oxides that include Group 2, 3, 4, 5, 13, and 14 oxides and chlorides in one embodiment, and more particularly, inorganic oxides and chlorides of Group 13 and 14 atoms. Yet more particularly, support materials include silica, alumina, silica-alumina, magnesium chloride, graphite, and mixtures thereof. Other useful supports include magnesia, titania, zirconia, montmorillonite (EP 0 511 665 B 1), phyllosilicate, and the like. Also, combinations of these support materials may be used, for example, silica-chromium, silica-alumina, silica-titania, and the like. Additional support materials may include those porous acrylic polymers described in EP 0 767 184 B1.

In certain embodiments, the two catalyst components reside on a single support particle. Alternatively, each catalyst can be supported on different support particles.

The in-reactor blends described herein are used as the styrenic modifiers of linear ethylene containing polymers and are blended with at least one linear ethylene polymer to prepare the compositions of this invention.

Physical Properties of the Blend Compositions

The blend composition possesses a unique combination of strong shear thinning, good melt strength (elasticity) and strong mechanical properties, such as elongation and tensile strength. In a plot of the loss or phase angle δ versus the measurement frequency, ω, polymers that have long chain branches exhibit a plateau in the function of δ(ω), whereas linear polymers do not have such a plateau. According to Garcia-Franco et al., Macromolecules, 34 (10), 3115, 2001, the plateau in the aforementioned plot will shift to lower phase angles δ when the amount of long chain branching occurring in the polymer sample increases.

The small amplitude oscillatory shear (SAOS) data can be transformed into discrete relaxation spectra using the procedure on pages 273-275 in R. B. Bird, R. C. Armstrong, and O. Hassager, Dynamics of Polymeric Liquids, Volume 1, Fluid Mechanics, 2nd Edition, John Wiley and Sons, 1987. The storage and loss moduli are simultaneously least squares fit with the functions $$G'(\omega_j) = \Sigma \eta_k \lambda_k \omega_j^2 / (1 + (\eta_k \omega_k)^2)$$

$$G''(\omega_j) = \Sigma \eta_k \lambda_k \omega_j / (1 + (\eta_k \omega_k)^2)$$

at the relaxation times $\lambda_k$=0.01, 0.1, 1, 10, and 100 seconds. Therefore, the sums are from k=1 to k=5. The sum of the $\eta_k$'s is equal to the zero shear viscosity, $\eta_0$. An indication of high levels of branched structure is a high value of $\eta_5$, corresponding to the relaxation time of 100 s, relative to the zero shear viscosity. The viscosity fraction of the 100 s relaxation time is $\eta_5$ divided by the zero shear viscosity, $\eta_0$. Chains with long relaxation times cannot relax during the cycle time of the SAOS experiment and lead to high zero shear viscosities.

Shear thinning is characterized by the decrease of complex viscosity with increasing frequency, and is described below. Generally, the resistance of a polymer melt to flow (steady-state viscosity) along a cylindrical tube decreases with increasing flow or shear rate. This is commonly referred to as shear thinning. More specifically, the viscosity is generally constant at low shear rates. This is the Newtonian region and the viscosity there is called the zero shear viscosity. It is commonly more difficult to reach the Newtonian region in very polydisperse commercial polymers. At high shear rates, the viscosity drops inversely with a power of the shear rate. This is called the power law region. The crossover from the Newtonian behavior to the power law behavior is characterized by a critical shear rate, usually defined for convenience as the shear rate at which the viscosity has decreased to 20% below the zero shear viscosity. Shear thinning is believed to result from the stretching of the "entangled" state to an "oriented" state of the polymer chains when the applied shear rate is higher than this critical shear rate. The product of this critical shear rate and the characteristic relaxation time of the polymer is a constant. This relationship appears to be quite universal for entangled polymers (linear or branched, monodisperse or polydisperse, and melts or solution) although a rather limited number of commercial polymers were used in the tests. Therefore, the longer relaxation time for a branched polymer makes the critical shear rate smaller than would be for a linear polymer with the same viscosity. Hence, the viscosity of a branched polymer is lower at high shear rates and the curves of viscosity plotted against shear rate for linear and branched polymers may cross. As a result, a polymer containing long branched structure(s) exhibits a higher degree of shear thinning than a linear polymer in the molten state.

One way to quantify the shear thinning is to use a ratio of the difference between the complex viscosity at a frequency of 0.1 rad/s and the complex viscosity at a frequency of 100 rad/s to the complex viscosity at a frequency of 0.1 rad/s when the complex viscosity is measured at 190° C. The larger this ratio, the higher is the degree of shear thinning. This ratio is the typical output of the SAOS experiments. A conventional SAOS test temperature is 190° C. Polymer viscosity is conveniently measured in poise (dyne-second/square centimeter) or Pa·s (1 Pa·s=10 poises) at frequencies within a range of from 0 to 100 rad/sec and at 190° C. under a nitrogen atmosphere using a dynamic mechanical spectrometer, such as the Advanced Rheometrics Expansion System (ARES). Generally a high degree of shear thinning indicates a polymer is readily processable in high shear fabrication processes, for example by injection molding.

In some embodiments, the polystyrene/polyethylene graft copolymer has a degree of shear thinning of 0.95 or more at 190° C. (preferably 0.96 or more, 0.97 or more, 0.98 or more, or 0.99 or more).

The blend compositions may have tensile strength greater than 15 MPa (as measured by ASTM D 638 at 23° C.), preferably greater than 20 MPa, preferably greater than 30 MPa. The blend compositions may have elongation at break greater than 300% (as measured by ASTM D 638 at 23° C.), preferably greater than 400%, preferably greater than 500%, preferably greater than 600%, preferably greater than 700%, preferably greater than 800%, preferably greater than 900%. The blend compositions can also have tensile strength at 100% elongation greater than 8 MPa (as measured by ASTM D 638 at 23° C.), preferably greater than 10 MPa, preferably greater than 12 MPa. In some embodiments, the blend compositions can have a tensile strength above 8 MPa, preferably a tensile strength above 10 MPa, and/or an elongation at break of at least 600%, preferably at least 700%, preferably at least 800%, and preferably at least 900%.

The blend compositions also show strain hardening in tensile measurements. After the yield point, the blend undergoes a period of strain hardening, in which the stress increases again with increasing strain up to the ultimate strength in a stress-strain curve as measured according to ASTM D 638 at 23° C.

The blend compositions can also have a toughness (as measured by ASTM D 638 at 23° C.) of 40 MJ/m$^3$ or more, preferably 50 MJ/m$^3$ or more, preferably 60 MJ/m$^3$ or more. Toughness is defined as the ability of polymer to absorb applied energy up to break. With respect to a plot of stress versus strain, the area under the stress-strain curve is used as a measure of the toughness at room temperature.

The blend compositions can have a density (as measured by ASTM 1505) in a range of from 0.840 g/cm$^3$ to 0.940 g/cm$^3$ in one embodiment, from 0.850 g/cm$^3$ to 0.93 g/cm$^3$ in a more particular embodiment, from 0.850 g/cm$^3$ to 0.920 g/cm$^3$ in yet a more particular embodiment, from 0.860 g/cm$^3$ to 0.930 g/cm$^3$ in yet a more particular embodiment, from 0.870 g/cm$^3$ to 0.92 g/cm$^3$ in yet a more particular embodiment, less than 0.925 g/cm$^3$ in yet a more particular embodiment, less than 0.920 g/cm$^3$ in yet a more particular embodiment, and less than 0.900 g/cm$^3$ in yet a more particular embodiment.

The blend compositions preferably have a bulk density of from 0.400 g/cm$^3$ to 0.900 g/cm$^3$ in one embodiment, and from 0.420 g/cm$^3$ to 0.800 g/cm$^3$ in another embodiment, and from 0.430 g/cm$^3$ to 0.500 g/cm$^3$ in yet another embodiment, and from 0.440 g/cm$^3$ to 0.60 g/cm$^3$ in yet another embodiment, wherein a desirable range may comprise any upper bulk density limit with any lower bulk density limit described herein.

The blend compositions preferably have one or more of the following properties:

a) a decrease in the viscoelastic phase angle ($\delta$) at a complex modulus of 10 kPa at 190° C. (as described in the Examples section below) of at least 0.2° per wt % of the polyethylene/polystyrene graft copolymer added relative to the linear ethylene containing polymer; and/or b) an increase in the degree of shear thinning at 190° C. (as described in the Examples section below) of at least 0.002 per wt % of the polyethylene/polystyrene graft copolymer added relative to the linear ethylene containing polymer; and/or c) a Young's Modulus (modified ASTM D 638 at 23° C.) of at least 250 MPa or more (preferably 300 MPa or more, preferably 350 MPa or more); and/or d) strain at yield (modified ASTM D 638 at 23° C.) of at least 2% or more (preferably 4% or more, preferably 5% or more); and/or e) stress at yield (modified ASTM D 638 at 23° C.) of at least 5 MPa or more (preferably 7 MPa or more, preferably 9 MPa or more); and/or f) stress at 100% strain (modified ASTM D 638 at 23° C.) of at least 5 MPa or more (preferably 7 MPa or more, preferably 9 MPa or more); and/or g) strain at break (modified ASTM D 638 at 23° C.) of at least 150% or more (preferably 200% or more, preferably 230% or more); and/or h) stress at break (modified ASTM D 638 at 23° C.) of at least 15 MPa or more (preferably 20 MPa or more, preferably 22 MPa or more); and/or i) toughness (determined as described in the Examples section) of at least 25 MJ/m$^3$ or more (preferably 30 MJ/m$^3$ or more, preferably 32 MJ/m$^3$ or more).

In some embodiments of this invention, the blend composition has one or more of the following properties:

(i) a phase angle (δ) of at least about 2° lower than the linear polyethylene at a complex modulus of 10 kPa at 190° C.;

(ii) a degree of shear thinning of at least about 0.02 greater than the linear polyethylene at 190° C.;

(iii) a tensile strength of within 5 MPa of the tensile strength of the linear polyethylene at room temperature; and (iv) an elongation at break of within 50% below the elongation at break of the linear polyethylene at room temperature.

In any embodiment of the present invention, the blend composition has a tensile strength of above, equal to or less than about 5 MPa below the tensile strength of the linear polyethylene at room temperature. In any embodiment of this invention, the blend composition has an elongation at break of above, equal to or less than about 50% below the elongation at break of the linear polyethylene at room temperature.

In any embodiment of this invention, the blend composition has a gel content of less than about 5 wt % (preferably 0 wt %) after extraction in boiling toluene for about 5 hours.

Use of the Polymer Blends

The blend compositions can be used in many applications where thermoplastics are used. The inventive blends provide high melt strength, ease of processability (shear thinning), and higher application temperatures over a wide range of densities. The blend compositions are useful in such forming operations as film, sheet, pipe and fiber extrusion, and co-extrusion, as well as blow molding, injection molding, and rotary molding. Films include blown or cast films formed by coextrusion or by lamination useful as shrink film, cling film, stretch film, sealing films, oriented films, snack packaging, heavy duty bags, grocery sacks, baked and frozen food packaging, cable and wire sheathing, medical packaging, industrial liners, membranes, etc. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

More particularly, the blend compositions are useful in making films. The films may be of any desirable thickness or composition, in one embodiment from 1 to 100 microns, and from 2 to 50 microns in a more particular embodiment. The resins used to make the films may be blended with other additives such as pigments, antioxidants, fillers, etc., as is known in the art, as long as they do not interfere with the desired film properties.

Film blowing is the most widely used extrusion technique in terms of polyethylene production volume. LLDPE's have narrower MWD's but contain no long chain branching (LCB). They have high entanglement densities which enhance film stretchability, leading to a higher resistance to damage by foreign objects to avoid tear and any subsequent down time during the high-speed blowing process. However, the high entanglement density makes LLDPE viscous in the molten state. Also, their short chain branching (SCB) does not enhance shear thinning. Therefore, LLDPE is more viscous at high shear rates when processed in the extruder and the die than LDPE, which contains a certain amount of LCB. The narrow MWD's of mLLDPEs even make them more difficult to flow than conventional LLDPE's (znLLDPE) made by Ziegler-Natta catalysis. At the same time, LLDPE's show lower extensional stresses at low strain rates in the molten tube and bubble inflation regions, hence more prone to bubble instability. Another important feature in film blowing is its ability to draw down the film so that its final gauge is much thinner than the die gap. However, this is limited by the strength of the melt in the bubble. In the case of a high nip roll speed, the tensile stress in the bubble will exceed the cohesive strength of the melt, leading to film rupture. Therefore, there is a need to improve the melt processability and the melt strength of both mLLDPE's and Ziegler-Natta LLDPE's in the film blowing process. Adding a polyethylene/polystyrene graft copolymer or a similar copolymer as described herein in a LLDPE can reduce or eliminate the above problems because the graft copolymer can slowly relax the polymer chains, leading to high zero shear viscosity, shear thinning, and melt elasticity. The long relaxation time of the LLDPE blended with the graft copolymer also produces a high melt strength and easy melt processing in extruders.

For the case of HDPE's, a high-MW polymer will yield a stronger but less flexible film. Also, it is a challenge to achieve a good balance of orientation in the machine and transverse directions, probably due to its extensional flow properties. Incorporating a polyethylene/polystyrene graft copolymer or a similar copolymer as described herein in HDPE can reduce or eliminate these shortcomings The blend compositions can also be used as an impact modifier of polypropylene. TPO (thermoplastic polyolefin) compounding is the process of mixing polypropylene (PP) with other ingredients to form a PP based multi-component mixture. For typical TPO applications, the TPO mixture can have about 10% to 30% in weight of the inventive polymer blend.

Thermoforming processes also favor the use of the high melt strength or the high melt elasticity of polyolefins. Thermoforming is the process of heating a solid plastic article, mostly in the sheet form, to a temperature where it softens, but does not flow, then reshaping it. This process has a large cost advantage over injection molding because of less expensive mold and lower energy expended. However, caution is to avoid the buildup of slack in the heated sheet needs to be exercised in the thermoforming process. It has been found that a polyolefin containing a certain amount of branching can improve its melt strength or elasticity, which in turn improves its sagging resistance. Although thermoforming process of polyethylene (PE) is not as popular as that of polypropylene (PP), adding a polyethylene/polystyrene graft copolymer or a similar copolymer as described herein in PE can improve the melt strength of PE during the thermoforming process.

The blend compositions may be used in any known application involving molding or extrusion, including consumer goods, industrial goods, construction materials, packaging materials, and automotive parts. The polyethylene/polystyrene graft copolymer or a similar copolymer composition described herein may be molded into desirable end use articles by any suitable means known in the art, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. They are particularly useful for making articles by injection molding, blow molding, film blowing, extrusion, thermoforming, gas foaming, elastowelding, and compression molding techniques.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING, pp. 90-92 (Jacqueline I. Kroschwitz, ed., John Wiley & Sons, 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

Preferred articles made using the polyethylene/polystyrene graft copolymer or a similar copolymer composition or its blend with a polyolefin described herein include cookware, storageware, toys, medical devices, medical containers, healthcare items, sheets, crates, containers, bottles, packaging, wire and cable jacketing, pipes, sporting equipment, chair mats, tubing, profiles, instrumentation sample holders and sample windows, automotive, boat and water craft components, and other such articles. In particular, the compositions are suitable for automotive components, such as trim parts, parts for dashboards and instrument panels, mirror housing, body panel, protective side molding, and other interior and external components associated with automobiles, trucks, boats, and other vehicles.

The disclosed molded parts may also be fabricated using a co-injection molding process, whereby an injection mold is used to form the part and/or lid and the materials are co-injected into the mold to form separate skins. Also, the part and/or lid can be fabricated using an overmolding process, whereby one of the layers is molded first and the other layers are molded over the previously molded structure. Conventional injection molding and thermal molding may also be utilized. Further, injection molding and blow molding techniques may be combined by injection molding a preform, which is transferred to a blow mold, and inflated to form an outer structure with inner structures or layers blown into the outer structure. The process can be repeated to form as many layers as desired.

In certain embodiments, the molded articles made of the compositions of the present invention are formed by thermoforming, blow molding, injection molding, compression molding, or injection-compression molding.

The nature of high shear thinning of the invented polyethylene/polystyrene graft copolymer or a similar copolymer composition or its blend with a polyolefin described herein provides a number of advantages in the injection molding processes. These materials allow using multi-shot injection molding, and making thinner and bigger pieces. It is also possible to use lower injection temperature for these invented compositions. In addition to the energy saving, lower injection temperature will reduce the sample cooling time and reduce the production cycle time, and make the injection process more efficient.

Embodiments of the present invention, relate to a film comprising the blend compositions disclosed above. Preferred embodiments have a tensile strength within 5 MPa of the tensile strength of the linear polyethylene.

Other embodiments of the present invention relate to:
1. A method for producing an alkene terminated polystyrene, comprising:
contacting a styrenic block copolymer (preferably comprising butadiene blocks (preferably the butadiene block is derived essentially from 1,4-butadiene); preferably one or more of a styrene-butadiene diblock, a styrene-butadiene-styrene triblock, a styrene-butadiene multiblock, a styrene-butadiene star block represented by the formula $(SB)_n$ (where S represents a styrenic block, B represents a butadiene block, and n is the number of arms and is an integer from 3 to 20) and blends thereof; more preferably styrene-butadiene-styrene triblock copolymer or blends thereof) and an alkene (preferably ethylene) in the presence of a metathesis catalyst (preferably comprising a Group 6 and/or Group 8 metal, preferably at least one of ruthenium, tungsten, and molybdenum) under conditions sufficient to produce an alkene terminated polystyrene (preferably vinyl terminated polystyrene) having an unsaturation functionality of at least 0.7 and a MWD of about 1.5 or less.
2. The method of paragraph 1, wherein the alkene terminated polystyrene has a MWD of about 1.2 or less (preferably, the $M_w$ of the alkene terminated polystyrene is within 15% of the $M_w$ of a single styrenic block of the sytrenic block copolymer).
3. The method of paragraphs 1 and 2, wherein the metathesis catalyst is represented by the Formula (A):

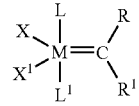

Formula (A)

wherein:
M is a Group 8 metal, preferably Ru or Os, preferably Ru;
X and $X^1$ are, independently, any anionic ligand, preferably a halogen (preferably Cl), an alkoxide or a triflate, or X and $X^1$ may be joined to form a dianionic group and may form single ring of up to 30 non-hydrogen atoms or a multinuclear ring system of up to 30 non-hydrogen atoms;
L and $L^1$ are, independently, a neutral two electron donor, preferably a phosphine, a cyclic alkyl amino carbene, or a N-heterocyclic carbene, L and $L^1$ may be joined to form a single ring of up to 30 non-hydrogen atoms or a multinuclear ring system of up to 30 non-hydrogen atoms;
L and X may be joined to form a multidentate monoanionic group and may form a single ring of up to 30 non-hydrogen atoms or a multinuclear ring system of up to 30 non-hydrogen atoms;
$L^1$ and $X^1$ may be joined to form a multidentate monoanionic group and may form a single ring of up to 30 non-hydrogen atoms or a multinuclear ring system of up to 30 non-hydrogen atoms;
R and $R^1$ are, independently, hydrogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl);
$R^1$ and $L^1$ or $X^1$ may be joined to form a single ring of up to 30 non-hydrogen atoms or a multinuclear ring system of up to 30 non-hydrogen atoms; and
R and L or X may be joined to form a single ring of up to 30 non-hydrogen atoms or a multinuclear ring system of up to 30 non-hydrogen atoms (preferably, the metathesis catalyst is one or more of: 2,6-diisopropylphenylimidoneophylidene molybdenum(VI) bis(t-butoxide), 2,6-diisopropylphenylimidoneophylidene molybdenum(VI) bis(hexafluoro-t-butoxide), 2,6-diisopropylphenylimido neophylidenemolybdenum (VI) bis(trifluoromethanesulfonate)dimethoxyethane adduct, 2,6-diisopropylphenylimidoneophylidene[racemic-BIPHEN]molybdenum(VI), tricyclohexylphosphine[1,3-bis(2,4,6-trimethylphenyl)imidazol-2-ylidene][3-phenyl-1H-inden-1-ylidene]ruthenium(II) dichloride, tricyclohexylphosphine[3-phenyl-1H-inden-1-ylidene][1,3-bis(2,4,6-trimethylphenyl)-4,5-dihydro-imidazol-2-ylidene]ruthenium(II) dichloride, tricyclohexylphosphine[1,3-bis(2,4,6-trimethylphenyl)-4,5-dihydroimidazol-2-ylidene][(phenylthio)methylene]ruthenium(II) dichloride, bis(tricyclohexylphosphine)-3-phenyl-1H-inden-1-ylideneruthenium(II) dichloride, 1,3-bis(2,4,6-trimethylphenyl)-4,5-dihydroimidazol-2-ylidene[2-(i-propoxy)-5-(N,N-dimethylaminosulfonyl)phenyl]methyleneruthenium(II) dichloride, [1,3-bis(2,4,6-trimethylphenyl)-2-imidazolidinylidene]-[2-[[(4-methylphenyl)imino]methyl]-4-nitrophenolyl]-[3-phenyl-1H-inden-1-ylidene]ruthenium(II) chloride, benzylidene-bis(tricyclohexylphosphine)dichlororuthenium, benzylidene[1,3-bis(2,4,6-trimethylphenyl)-2-imidazolidinylidene]dichloro(tricyclohexylphosphine)ruthenium, dichloro(o-isopropoxyphenylmethylene)(tricyclohexylphosphine)ruthenium(II), (1,3-bis-(2,4,6-trimethylphenyl)-2-imidazolidinylidene)dichloro(o-isopropoxyphenylmethylene)ruthenium, 1,3-bis(2-methylphenyl)-2-imidazolidinylidene]dichloro(2-isopropoxyphenylmethylene)ruthenium(II), [1,3-bis(2,4,6-trimethylphenyl)-2-imidazolidinylidene]dichloro[3-(2-pyridinyl)propylidene]ruthenium(II), [1,3-bis(2-methylphenyl)-2-imidazolidinylidene]dichloro(phenylmethylene) (tricyclohexylphosphine)ruthenium(II), [1,3-bis(2,4,6-trimethylphenyl)-2-imidazolidinylidene]dichloro(3-methyl-2-butenylidene)(tricyclohexylphosphine)ruthenium(II), and [1,3-bis(2,4,6-trimethylphenyl)-2-imidazolidinylidene]dichloro(benzylidene)bis(3-bromopyridine)ruthenium(II).

4. The method of paragraphs 1 to 3, wherein the catalyst is selected from one or more of the following structures:

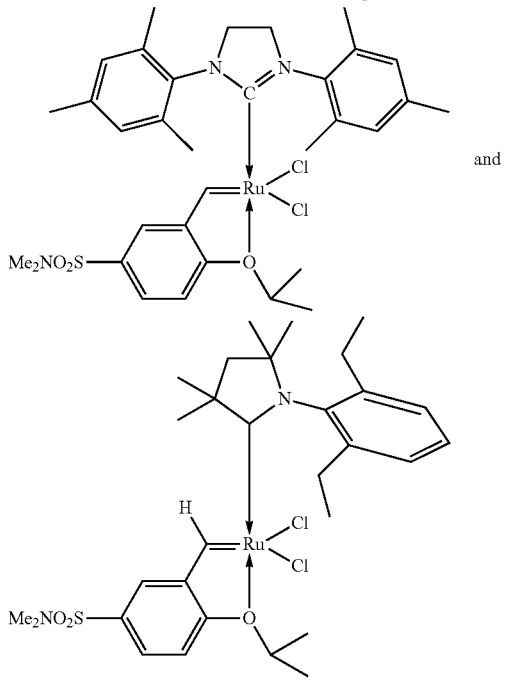

wherein Me is methyl.

5. The method of paragraphs 1 to 4, further comprising: grafting the vinyl terminated polystyrene to a polyolefin (preferably, linear polyethylene) to form a polyolefin/polystyrene graft copolymer composition (preferably, by reactive blending in the presence of at least one organic peroxide, preferably dicumyl peroxide; preferably a diblock copolymer of polystyrene and polyolefin is produced in a yield of at least 40 wt %, based on the weight of the polyolefin/polystyrene graft copolymer composition).

6. The method of paragraphs 1 to 4, further comprising: contacting the vinyl terminated polystyrene with ethylene monomer in the presence of a polymerization catalyst system (preferably comprising at least one metallocene catalyst and an activator; preferably at least one metallocene catalyst and an alumoxane) to form a polyethylene/polystyrene copolymer.

7. The method of paragraph 6, wherein the vinyl terminated polystyrene and the ethylene monomer are polymerized in the same reaction zone as that in which the styrenic block copolymer and the ethylene are contacted to produce the vinyl terminated polystyrene.

8. The methods of paragraphs 5 to 7, wherein polyethylene/polystyrene copolymer has one or more of the following properties:
   (i) a branching index, g' of less than about 0.9;
   (ii) a phase angle ($\delta$) of less than about 45° at a complex modulus of 10 kPa at 190° C.;
   (iii) a gel content of less than about 5 wt % after extraction in boiling toluene for about 5 hours; and
   (iv) a degree of shear thinning of 0.95 at 190° C. or more.

9. A polyethylene blend composition, comprising:
   (i) 99.0 wt % or less of a linear polyethylene having a density of at least 0.910 g/cm$^3$, preferably 0.940 g/cm$^3$ or more (and preferably a CDBI of 60% or more; preferably an LLDPE or an HDPE; preferably having an $M_w$ of 50,000 g/mol or more, a g' of 0.95 or more, and an $M_w/M_n$ of from greater than about 1 to about 10, and comprises from 50 mol % to 100 mol % ethylene and from 0 mol % to 50 mol % of C$_3$ to C$_{40}$ comonomer; preferably the linear polyethylene is a polymer of an ethylene and at least one alpha-olefin having 5 to 20 carbon atoms, where the linear polyethylene has a melt index (190° C./2.16 kg) of from about 0.1 to 15 dg/min; a CDBI of at least 70%; a density of from about 0.910 to about 0.930 g/cm$^3$; a haze value of less than 20; a melt index ratio of from about 35 to 80; an averaged modulus, M, of from about 137.9 to 413.7 MPa; and a relation between M and the dart impact strength in g/mil, DIS (measured on a film of less than 0.25 mm thickness), complying with the formula:

$$DIS \geq 0.8[100+\exp(11.71-0.000268M+2.183\times10^{-9}M^2)]) \text{ and}$$

(ii) at least 1.0 wt % of a polyethylene/polystyrene graft copolymer (preferably from about 2 wt % to about 20 wt %, based on a total weight of the composition) produced by the methods of paragraphs 6 and/or 7 comprising from about 70 wt % to about 98 wt % polyethylene and from about 2 wt % to about 30 wt % polystyrene (preferably from about 5 wt % to 25 wt % polystyrene, from 10 wt % to 20 wt % polystyrene).

10. The composition of paragraph 9, wherein the blend composition has one or more of the following properties:
   (i) a phase angle ($\delta$) of at least about 2° lower than the linear polyethylene at a complex modulus of 10 kPa at 190° C.;
   (ii) a degree of shear thinning of at least about 0.02 greater than the linear polyethylene at 190° C.;

(iii) a tensile strength of above, equal to or less than about 5 MPa below the tensile strength of the linear polyethylene at room temperature;

(iv) an elongation at break of above, equal to or less than about 50% below the elongation at break of the linear polyethylene at room temperature;

(v) optionally a gel content of less than about 5 wt % after extraction in boiling toluene for about 5 hours.

11. An article comprising the composition of paragraph 9 (preferably, the article is a film; preferably having a tensile strength within 5 MPa of the tensile strength of the linear polyethylene).

EXAMPLES

The foregoing discussion can be further described with reference to the following non-limiting examples.

Test Methods

Molecular Weight (Mn, Mw, Mz, and Mw/Mn)

Weight-average molecular weight, $M_w$, and molecular weight distribution (MWD), $M_w/M_n$, where $M_n$ is the number-average molecular weight, of HDPE and the polyethylene/polystyrene graft copolymer (PE-g-PS) were characterized using a High Temperature Size Exclusion Chromatograph (SEC), equipped with a differential refractive index detector (DRI), an online light scattering detector, and a viscometer, relative to a polystyrene standard. Experimental details not described below, including how the detectors were calibrated, are described in: T. Sun, P. Brant, R. R. Chance, and W. W. Graessley, Macromolecules, Volume 34, Number 19, 6812-6820, 2001. Solvent for the SEC experiment was prepared by dissolving 6 g of butylated hydroxy toluene as an antioxidant in 4 L of Aldrich reagent grade 1,2,4 trichlorobenzene (TCB). The TCB mixture was then filtered through a 0.7 μm glass pre-filter and subsequently through a 0.1 μm Teflon filter. The TCB was then degassed with an online degasser before entering the SEC. Polymer solutions were prepared by placing the dry polymer in a glass container, adding the desired amount of TCB, then heating the mixture at 160° C. with continuous agitation for about 2 hr. All quantities were measured gravimetrically. The TCB densities used to express the polymer concentration in mass/volume units are 1.463 g/mL at room temperature and 1.324 g/mL at 135° C. The injection concentration ranged from 1.0 to 2.0 mg/mL, with lower concentrations being used for higher molecular weight samples. Prior to running each sample the DRI detector and the injector were purged. Flow rate in the apparatus was then increased to 0.5 mL/min, and the DRI was allowed to stabilize for 8-9 hr before injecting the first sample. The LS laser was turned on 1 to 1.5 hr before running samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and dn/dc is the same as described below for the LS analysis. Units on parameters throughout this description of the SEC method are such that concentration is expressed in g/cm³, molecular weight is expressed in kg/mol, and intrinsic viscosity is expressed in dL/g. The light scattering detector used was a Wyatt Technology High Temperature mini-DAWN. The polymer molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

where $\Delta R(\theta)$ is the measured excess Rayleigh scattering intensity at scattering angle θ, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_o = \frac{4\pi^2 n^2 \left(\frac{dn}{dc}\right)^2}{\lambda^4 N_A}$$

in which $N_A$ is the Avogadro's number, and dn/dc is the refractive index increment for the system. The refractive index, n=1.500 for TCB at 135° C. and λ=690 nm. In addition, $A_2$=0.0015 and dn/dc=0.104 for ethylene polymers, whereas $A_2$=0.0006 and dn/dc=0.104 for propylene polymers. The molecular weight averages usually defined by considering the discontinuous nature of the distribution in which the macromolecules exist in discrete fractions containing $N_i$ molecules of molecular weight $M_i$. The weight-average molecular weight, $M_w$, is defined as the sum of the products of the molecular weight $M_i$ of each fraction multiplied by its weight fraction $w_i$:

$$M_w \equiv \Sigma w_i M_i = (\Sigma N_i M_i^2 / \Sigma N_i M_i)$$

since the weight fraction $w_i$ is defined as the weight of molecules of molecular weight $M_i$ divided by the total weight of all the molecules present:

$$w_i = N_i M_i / \Sigma N_i M_i.$$

The number-average molecular weight, $M_n$, is defined as the sum of the products of the molecular weight $M_i$ of each fraction multiplied by its mole fraction $x_i$:

$$M_n \equiv \Sigma x_i M_i = \Sigma N_i M_i / \Sigma N_i$$

since the mole fraction $x_i$ is defined as $N_i$ divided by the total number of molecules:

$$x_i = N_i / \Sigma N_i$$

The ratio of $M_w/M_n$ is the molecular weight distribution (MWD).

In the SEC, a high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, [η], at each point in the chromatogram was calculated from the following equation:

$$\eta_s = c[\eta] + 0.3(c[\eta])^2$$

where c was determined from the DRI output. The branching index (g') was calculated using the output of the SEC-DRI-LS-VIS method as follows. The average intrinsic viscosity, $[\eta]_{avg}$, of the sample was calculated by:

$$[\eta]_{avg} = \frac{\Sigma c_i [\eta]_i}{\Sigma c_i}$$

where the summations are over the chromatographic slices, i, between the integration limits. The branching index g' is defined as:

$$g' = \frac{[\eta]_{avg}}{k M_v^\alpha}$$

where k=0.000579 and α=0.695 for ethylene polymers, k=0.0002288 and α=0.705 for propylene polymers, and k=0.00018 and α=0.7 for butene polymers. $M_v$ is the viscosity-average molecular weight based on molecular weights determined by the LS analysis:

$$M_v = (\Sigma c_i M_i^\alpha / \Sigma c_i)^{1/\alpha}$$

In practice, it is found that $M_v$ differs ordinarily only slightly from the $M_w$.

A WATERS 150C GPC using THF as the permeation solvent at 40° C. and equipped with UV and DRI detectors was used to determine the values of $M_n$ and $M_w$ of SBS and VTPS. Flow rate was 1 mL/min through four Polymer Laboratories columns of $10^5$, $10^4$, $10^3$, and 500 Å.

NMR

The composition and the microstructure of each of these polymers were obtained by $^1$H NMR using either a VARIAN or BRUKER NMR operating at 500 MHz with deuterated chloroform as the solvent.

Stress/Strain

PE, its blend with PE-g-PS, and other polymers were compression-molded into plaques with a thickness of about 0.7 mm and a thickness of about 2 mm using a press at 180° C., a molding time of 15 min, and a press force of 25 tons.

In the stress-strain experiments, the molded plaque with a thickness of about 2 mm was die-cut into micro-dumbbell specimens (the base was ~1 cm×1 cm and the center, narrow strip was ~0.6 cm×0.2 cm). Stress-strain measurements under tension were then performed in an INSTRON tester. Measurements using triplicate samples (conditioned under ambient conditions for 24 hr prior to tests) were performed at 23° C. and at a separation speed of 2"/min=850 μm/s until each dumbbell sample was broken. The stress was calculated based on the undeformed cross-sectional area of the test specimen. Strain measurements were based on clamp separation. From these stress-strain data points, the whole stress-strain curve was constructed. Tensile parameters, such as the Young's modulus ($E_o$; obtained from the initial slope of the stress-strain curve), the yield strain ($e_y$), the yield stress ($\sigma_y$), the modulus at 100% strain ($E_{100}$), the strain at break ($e_b$), the tensile strength ($\sigma_b$), and the tensile toughness (U; calculated as the total area under the stress-strain curve) were then determined Some of the PE materials described in this invention showed two yield points. According to N. W. Brooks, et al., J. Macromol. Sci., B 34, 29, 1995, the first yield point corresponds to reorientation/rotation of the lamellae within the spherulites in PE. The reoriented lamellae are oriented at about 45° to the draw direction. The second yield point corresponds to the destruction of the lamellae laying 45° to the draw direction. The subsequent permanent deformation corresponds to a crystallographic slip processes correspond to the breakup of lamellar structures for the lamellae oriented perpendicular to the draw direction, and chain pull-out (along lamellar axes) for those lamellae oriented parallel to the draw direction. Both processes lead to extended chain crystals. The original lamellae are destroyed and then re-crystallize into extended chain crystals, which appear as additional transitions in the stress-strain curve. The values of $e_y$ and $\sigma_y$ shown in the various tables of this invention were based on the first yield point starting from the lower-strain region of the stress-strain curve.

For the DMTA experiment, a sample with a dimension of ~23 mm×6.42 mm was die-cut from the compression-molded plaque with a thickness of about 0.7 mm. It was conditioned under ambient conditions for 24 hr before the DMTA measurement. The instrument used was the DMTA V in tension mode (0.05% strain, 1 Hz frequency, 2° C./min heating rate, and a temperature range of ca. −100 to 150° C.). For PE, the α and β relaxation temperatures were determined from the loss tangent maxima.

Rheology

For polymer and blend rheological experiment, a circular sample with a diameter of 25 mm was die-cut from the compression-molded plaque with a thickness of about 2 mm. It was mounted between the 25-mm diameter parallel plates in a Rheometric Scientific™ ARES Analyzer (1998). The test temperature was 190° C. and the strain applied was 10%. The complex modulus (G*), the phase angle (δ), and the complex viscosity (η*) were measured as the frequency was varied from 0.01 to 100 rad/s. The plot of phase angle versus the complex modulus is known as the van Gurp-Palmen plot (Please see M. van Gurp and J. Palmen, Rheol. Bull., 67, 5-8, 1998). The values of δ listed in the various tables of this invention are those at a complex modulus, G*, of 10 kPa. The higher the value of this δ, the higher is the melt elasticity or melt strength. The dependence of complex viscosity as a function of frequency can also be determined from the rheological measurements. The following ratio:

$$[\eta^*(0.1 \text{ rds}) - \eta^*(100 \text{ rds})]/\eta^*(0.1 \text{ rds})$$

was used to measure the degree of shear thinning of the polymeric materials discussed in the various tables of this invention, where η*(0.1 rds) and η*(100 rds) are the complex viscosities at frequencies of 0.1 and 100 rds, respectively, measured at 190° C. and rds is rads or radians. The higher this ratio, the higher is the degree of shear thinning.

Melt Index

Melt index (MI) expressed in dg/min was measured according to ASTM D 1238 at 190° C. A load of 2.16 kg was used.

Melting Temperatures

The crystallization temperature $T_c$ and melting temperature $T_m$ of the polymer were measured using a DSC Q100 equipped with 50 auto-samplers from TA Instruments. This DSC was calibrated with an indium standard weekly. Typically, 6-10 mg of a polymer was sealed in an aluminum pan with a hermetic lid and loaded into the instrument. In a nitrogen environment, the sample was first cooled to −90° C. at 20° C./min. It was heated to 220° C. at 10° C./min and melting data (first heat) were acquired. This provides information on the melting behavior under as-received conditions, which can be influenced by thermal history as well as sample preparation method. The sample was then equilibrated at 220° C. to erase its thermal history. Crystallization data (first cool) were acquired by cooling the sample from the melt to −90° C. at 10° C./min and equilibrated at −90° C. Finally it was heated again to 220° C. at 10° C./min to acquire additional melting data (second heat). The exothermic crystallization transition (first cool) was analyzed for peak temperature as $T_c$. The endothermic melting transition (second heat) was analyzed for peak temperature as $T_m$.

Materials

In the following examples, the styrenic block copolymer (SBC) was VECTOR™ 6241A, a SBS triblock copolymer, commercially obtained from Dexco Polymers (Houston, Tex.).

Cyclic alkyl amino carbene (CAAC) catalyst D was prepared following the procedure described in WO2011/056884, and Zhan Catalyst 1-B was commercially obtained from Strem Chemicals, Inc. (Newburyport, Mass.).

The HDPE, HD 6706.17, was commercially obtained from ExxonMobil Chemical Company. It had a $M_n$ of 22,000, an $M_w$ of 76,000, and a branching index, g', is reported to be 0.967. MI was 6.7 dg/min, density was 0.952 g/cm³, DSC $T_c$ was 114° C., DSC $T_m$ was 131° C., and DSC heat of fusion was 188 J/g.

Dicumyl peroxide (DCP; melting point=39° C. to 41° C.) was commercially obtained from Sigma-Aldrich and used as received.

EXCEED™ PE 2018 (mLLDPE containing 6 wt % hexene) was obtained commercially from ExxonMobil Chemical Company and some of its properties are reported in Table 1, below. From DSC, its $T_c$ was 106° C., $T_m$ was 119° C., and heat of fusion was 142 J/g.

TABLE 1

Properties of EXCEED ™ PE 2018

| PE | Type | MI @ 2.16 kg, dg/min | Density, g/cm³ | $M_w$, kg/mol | $M_w/M_n$ | g' | α Relaxation | β Relaxation |
|---|---|---|---|---|---|---|---|---|
| EXCEED ™ PE 2018 | mLLDPE w/o LCB | 2.0 | 0.918 | 100 | 1.97 | 1.098 | 80° C. | About −9° C. |

Example 1

The SBS (VECTOR 6241A) was dissolved in toluene at a concentration of about 8 wt %. The solution was treated over 4A molecular sieves. The dissolved polymer was then precipitated in a large volume of methanol and washed several times by methanol. It was dried in a vacuum oven (50° C. for 2 days and then at room temperature for 4 days or longer). Inside a dry box, fresh toluene (dried by alumina beads calcined at 300° C.) was used to dissolve the purified SBS to prepare a 10 wt % polymer solution. This toluene solution of SBS was added to a thick-wall glass reactor together with the ruthenium catalyst (polybutadiene repeat unit/catalyst molar ratio=500). The metathesis reaction was carried out at an ethylene pressure of 140 psi to 150 psi and a temperature of 40° C. for 3 hr. A few drops of ethyl vinyl ether were added to deactivate the catalyst at the end of the reaction. The reaction mixture was precipitated in a large volume of methanol and the resulting polymer was washed several times by methanol. It was then dried in a vacuum oven at room temperature for one week or longer. The polymer was studied by GPC and proton NMR.

In Table 2, below, the VTPS polymers produced by Catalyst D and the Zhan Catalyst 1-B are denoted by VTPS-1 and VTPS-2, respectively. Based on the styrene content (41 wt %), $M_n$ and $M_w$ of a single PS block in the precursor SBS are 12 and 14 kg/mol, respectively. Therefore, the $M_n$ and $M_w$ of each VTPS are very close to those of the single PS block in the starting SBS, indicating depolymerization occurred quantitatively to the PS block after the metathesis reaction.

The GPC curves in FIG. 1 also demonstrate the conversion of the higher molecular weight SBS to the lower molecular weight polymer. The MWD of each VTPS is narrow with a value of 1.1. Consistently NMR data also suggest that the complete polybutadiene middle block of the original SBS was largely degraded except for some minute amounts of vinyl and internal unsaturations left.

TABLE 2

SBS and VTPS Characterization

| | SBS | VTPS-1 | VTPS-2 |
|---|---|---|---|
| $M_n$, kg/mol | 57 | 11 | 11 |
| $M_w$, kg/mol | 67 | 12 | 12 |
| $M_w/M_n$ | 1.2 | 1.1 | 1.1 |
| Styrene, Wt % | 41 | ~98.8 | ~99.0 |
| cis-1,4-Butadiene, wt % | 27 | | |
| trans-1,4-Butadiene, wt % | 26 | | |
| 1,4-Butadiene Total, wt % | 53 | ~0.4 | ~0.4 |
| 1,2-Butadiene, wt % | 6 | ~0.8 | ~0.6 |

As discussed above, the VTPS can be used as a macromonomer, which can be homopolymerized or copolymerized with other comonomers. The metathesis and the polymerization reactions can be performed in one pot (the "in-reactor blend" approach), especially in the case of metallocene polymerization, because activator, such as alumoxane or modified alumoxane, is able to deactivate the ruthenium catalyst.

Figure 2:
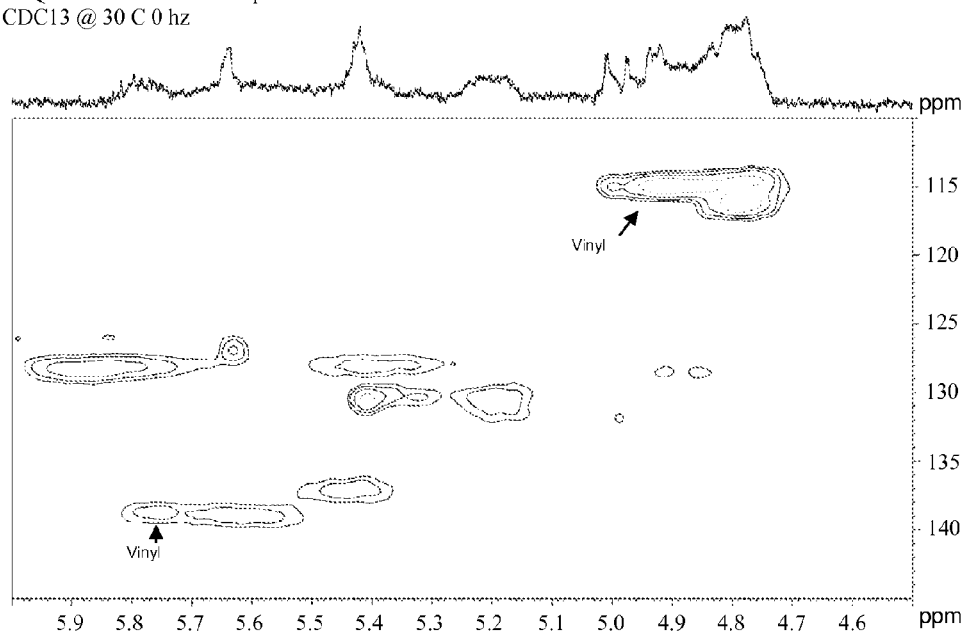
FIG. 2 depicts the two-dimensional HSQC (heteronuclear single-quantum correlation spectroscopy) NMR spectrum of the olefinic region of VTPS-2.

FIG. 2 is a 2-dimensional HSQC NMR spectrum of the olefinic region from VTPS-2. This plot has the $^1H$ chemical shift horizontally and the $^{13}C$ chemical shift vertically shows directly bonded hydrogen/carbon connectivity. The 1-dimensional $^1H$ spectrum is shown at the top of the figure. When vinyl groups are present the two carbons in the structure have chemical shifts at 114 ppm to 115 ppm and 139 ppm to 140 ppm and the corresponding directly bonded hydrogen shifts are at 4.9 ppm to 5.1 ppm and 5.6 ppm to 5.8 ppm. These intensities at these intersecting areas are labeled in the figure. Their presence demonstrates that vinyl groups have been generated in the reaction product. The other intensities in the data are from additional unsaturated species, most likely internal olefins.

Example 2

About 100 g of SBS (VECTOR 6241A) was dissolved in toluene at a concentration of about 8 wt %. The solution was dried over the 4A molecular sieves. The dissolved polymer was then precipitated in a large volume of methanol and washed several times using methanol. The precipitate was dried in a vacuum oven (50° C. for 2 days and room temperature for 4 days or longer).

Ethenolysis of this larger amount of purified SBS was carried out in a 2-L reactor. The typical reactor drying cycle was performed and it was allowed to cool under nitrogen. About 80 g (approximately 850 mmol butadiene units) of small pieces of SBS were added to the reactor. The reactor containing the polymer was degassed with five high pressure/vent cycles. About 1300 mL of purified toluene was added to the reactor, which was heated to 110° C. to dissolve the SBS. The mixture of SBS and toluene was stirred after heated for 15 min. This heating/stirring process was continued for a total of 30 min. Then the reactor was cooled to 40° C. The reactor was pressurized to 140 psi (0.965 MPa) of ethylene. A catalyst solution prepared from 20-mL dichloromethane and 1.24 g (1.69 mmol) Zhan Catalyst 1B was added to the SBS solution. The ethylene pressure was maintained and the mixture was stirred at 40° C. for 4 h. The reaction was quenched by adding ethyl vinyl ether (2.44 g, 33.8 mmol) dissolved in toluene. The reaction mixture was cooled to 20° C. and stirred for 20 min. The reactor was vented and dropped. The dark brown solution was poured slowly into a large body of stirring methanol. The isolated solid VTPS-3 polymer was washed thoroughly with a large amount of methanol and then dried in the hood, then further dried in a vacuum oven.

VTPS-3 has a GPC $M_n$ of 9,630 g/mol and a GPC $M_w$ of 11,100 g/mol. The NMR mole ratio of styrene to vinyl is 111 to 1. The vinyl functionality (f) of VTPS-3 is (9,630/104)/111=0.83, where 104 is the molecular weight the styrene monomer.

Example 3

HDPE pellets (HD 6709.17, 37.4 g), VTPS-3 (6.6 g), and DCP (0.1 g) were weighed and put inside a plastic bottle. These ingredients were dry mixed by shaking the bottle vigorously for 5 minutes. A BRABENDER™ mixer (50-g capacity) was then heated to 175° C. The dry mix was introduced by a fast rate (completed in less than 0.5 min) into the preheated BRABENDER™ mixer. A rotor speed of 50 rpm was used throughout the run and the system was kept at temperature desired and stable. Mixing was continued for 10 minutes once all the blend components were incorporated in the HDPE. Finally the blend was discharged from the mixer and allowed to cool down. This BRABENDER™ reactive blend was denoted by PE-g-PS (polyethylene/polystyrene graft copolymer).

The BRABENDER™ reactive blend of PE-g-PS was cut into small pieces, with a sample weight of about 0.5 g. The cut sample was put inside a pre-weighed stainless steel thimble. Solvent extraction using a soxhlet apparatus refluxing at the boiling point of cyclohexane (80° C.) was carried out for 5 hr. The soluble fraction was determined to be 2.8 wt %, suggesting that almost all the VTPS-3 had been grafted to the HDPE in the PE-g-PS, because boiling cyclohexane should be a good solvent for homopolystyrene but not for HDPE. Therefore, the styrene content in PE-g-PS is about 15 wt % based on the amounts of HDPE and VTPS-3 charged to the BRABENDER™ mixer. Results of the High Temperature Size Exclusion Chromatograph (SEC) are shown in Table 3, below. The SEC trace of PE-g-PS was broad but remained quite unimodal with a low molecular weight shoulder.

TABLE 3

SEC Data of HDPE and PE-g-PS

| Polymer | $M_n$, kg/mole | $M_w$, kg/mole | G' |
|---|---|---|---|
| HDPE | 22 | 76 | 0.967 |
| PE-g-PS | 33 | 97 | 0.866 |

The gel content of PE-g-PS was determined by solvent extraction using a soxhlet apparatus and refluxing at the boiling point (110° C.) of toluene for 5 hours. The insoluble fraction was 0.96 wt %, suggesting that PE-g-PS is almost free of gel.

Figure 3:
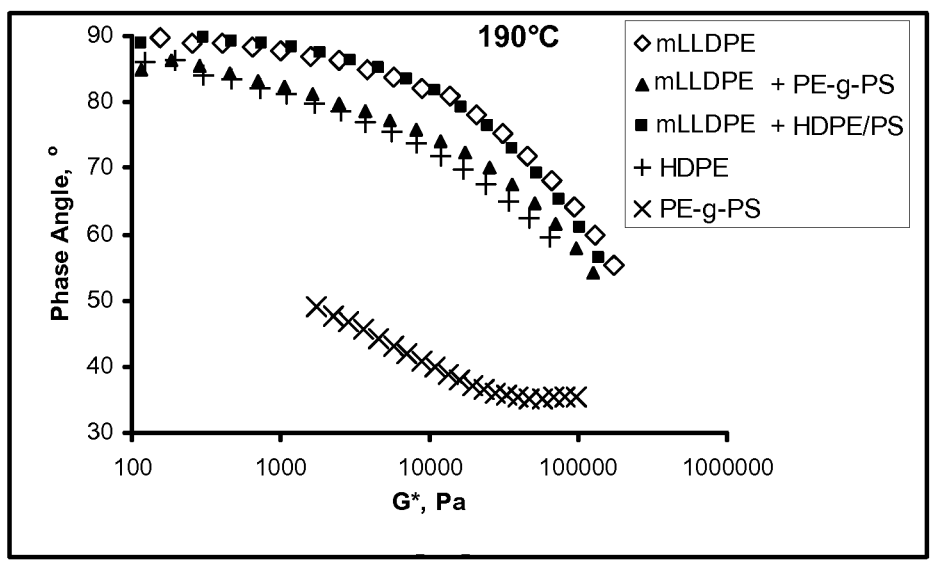
FIG. 3 depicts the van Gurp-Palmen plots of certain blend components used in the Examples.
Figure 4:
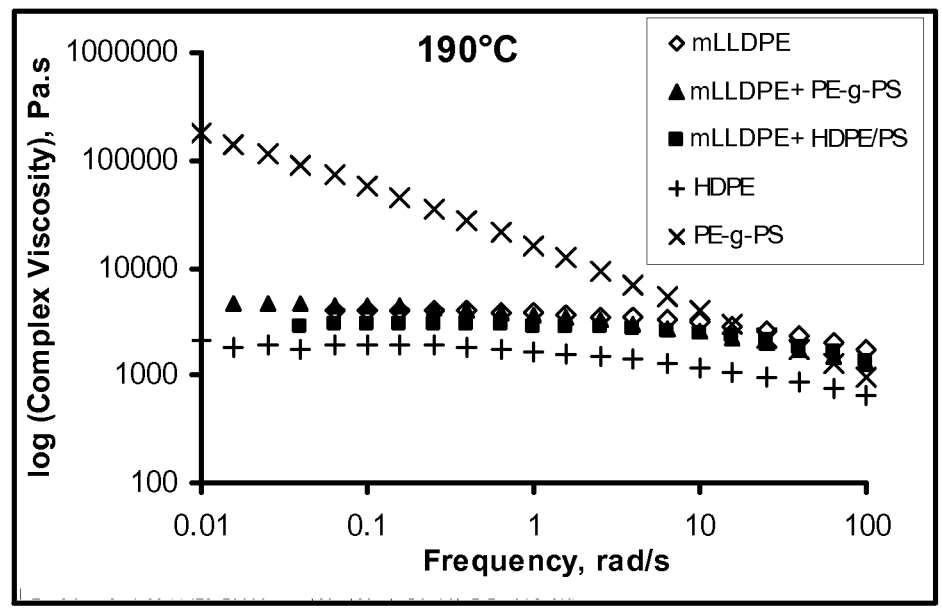
FIG. 4 depicts the complex viscosity versus frequency plots of the blend components plotted in FIG. 3.
Figure 5:
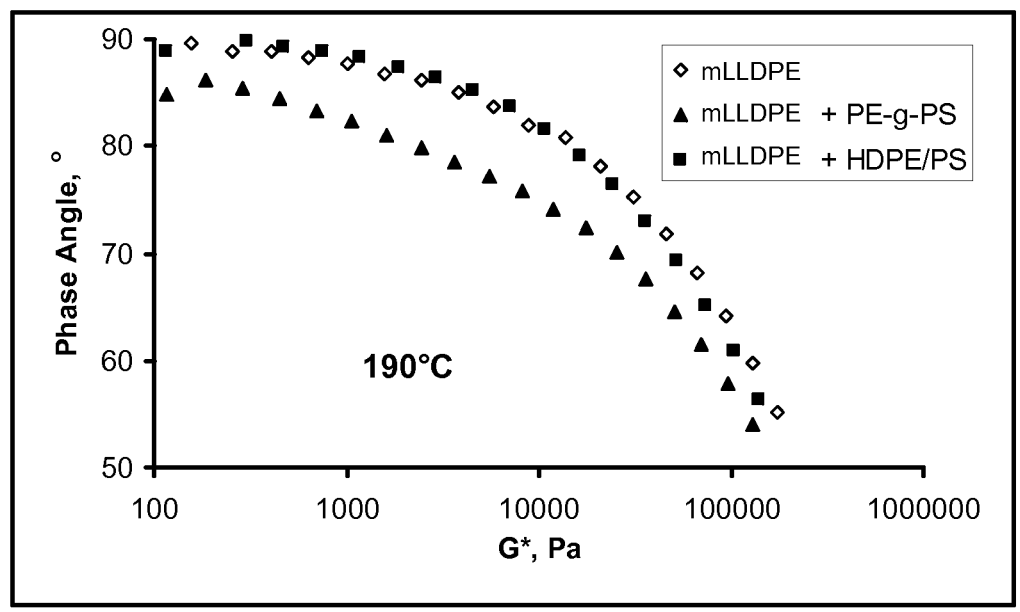
FIG. 5 depicts the van Gurp-Palmen plots of an mLLDPE and its blends with 10 wt % of the PE/PS graft copolymer (PE-g-PS) or the HDPE/PS blend (HDPE/PS), where PS is polystyrene, as used in the Examples.

Table 4 compares the properties of PE-g-PS to the neat HDPE. FIG. 3 compares the van Gurp-Palmen plot of PE-g-PS compared to the neat HDPE. The grafting reaction of VTPS-3 to HDPE decreases the phase angle of HDPE, thereby enhancing the melt elasticity of HDPE. In Table 4, the phase angle at G*=10 kPa is used to rank the two polymeric materials. FIG. 4 compares the flow curves of PE-g-PS to HDPE. The grafting reaction of VTPS-3 to HDPE produces a large enhancement in the degree of shear thinning of HDPE, see also the column labeled as "Degree of Shear Thinning" in Table 4.

TABLE 4

Properties of HDPE and PE-g-PS

| Polymer | $\delta^{(1)}$ | Degree of Shear Thinning | $E_o$, MPa | $e_y$, % | $\sigma_y$, MPa | $E_{100}$, MPa | $e_b$, % | $\sigma_b$, MPa | U, MJ/m³ |
|---|---|---|---|---|---|---|---|---|---|
| HDPE | 73° | 0.67 | 1040 | 5.0 | 25 | 15 | 430 | 24 | 74 |
| PE-g-PS | 40° | 0.98 | 1629 | 2.9 | 20 | 14 | 150 | 9.8 | 21 |

(1)Phase angle at a complex modulus of 10 kPa

Example 4

A BRABENDER™ mixer (50 g capacity) was heated to 200° C. A mixture of EXCEED™ PE 2018 (39.6 g) and PE-g-PS (4.4 g) from Example 3 was introduced in the preheated BRABENDER™ together with 500 ppm of IRGANOX™ 1076, 1000 ppm of IRGAFOS™ 168, and 800 ppm of Dynamar™ FX 5920A. A rotor speed of 50 rpm was used throughout the run and the system was kept at 200° C. Mixing was continued for 10 min once all the blend components were incorporated in the mLLDPE. Finally the blend was discharged from the mixer and allowed to cool down. This Brabender blend is denoted as "EXCEED™+PE-g-PS".

Example 5

An anionic polymerized PS was prepared as follows. Styrene (Sigma Aldrich) was dried over a slurry of finely ground calcium hydride, and vacuum distilled to a storage flask protected from outside air and moisture by a septum. A 1 L round bottom flask reactor equipped with a septum and a stir bar was purged thoroughly with nitrogen. A 50 mL syringe was purged with nitrogen and was used to uptake 130 mL of anhydrous cyclohexane (Sigma-Aldrich). This cyclohexane was injected through the septum of the reactor. A 30 mL syringe was purged with nitrogen and was uptake to draw 20 mL of purified styrene from the storage flask of the distilling apparatus. It was then injected into the reactor through the septum.

Figure 6:
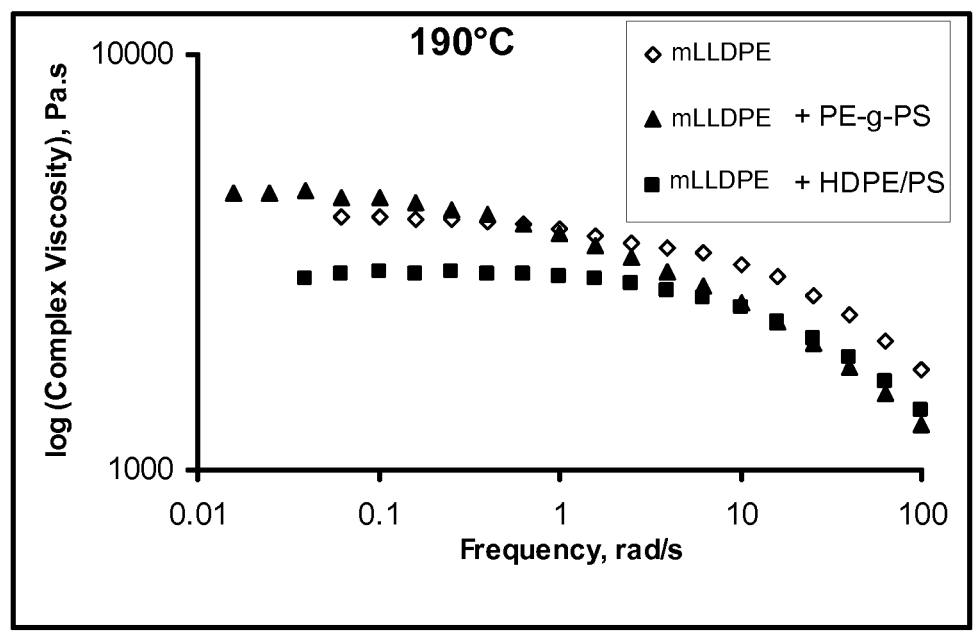
FIG. 6 depicts the complex viscosity versus frequency plots of the blend components plotted in FIG. 5.

FIGS. 4 and 6. On the other hand, 10 wt % of HDPE/PS in EXCEED™ PE 2018 produced insignificant changes in the phase angle and degree of shear thinning of EXCEED™ PE 2018; see Table 4 and FIGS. 3-6.

TABLE 4A

Properties of EXCEED ™ PE 2018 Mixed with 10 Wt % of PE-g-PS or HDPE/PS

| Polymer | $\delta^{(1}$ | Degree of Shear Thinning | $E_o$, MPa | $e_y$, % | $\sigma_y$, MPa | $E_{100}$ MPa | $e_b$, % | $\sigma_b$, MPa | U, MJ/m$^3$ |
|---|---|---|---|---|---|---|---|---|---|
| EXCEED ™ PE 2018 | 81 | 0.57 | 348 | 22 | 11 | 11 | 32 | 33 | 54 |
| EXCEED ™ PE 2018 + 10 wt % PE-g-PS | 75 | 0.71 | 428 | 5.9 | 11 | 11 | 32 | 32 | 54 |
| EXCEED ™ PE 2018 + 10 wt % HDPE/PS | 82 | 0.54 | 392 | 23 | 11 | 11 | 31 | 31 | 50 |

$^{(1}$Phase angle at a complex modulus of 10 kPa

At this point, the content of the reactor was titrated with about 0.1-0.2 mL of sBuLi (sec-butyl lithium, 1.4 M in cyclohexane from Sigma-Aldrich) until a pale yellow color was observed to persist in the solution. Then 1 mL of sBuLi was charged to the reactor and the color of the solution turned bright orange. The same bright orange color continued for the next 4 hr. About 20 mL of methanol (Sigma-Aldrich) was injected in a small round bottom flask equipped with a stir bar and a septum. The flask was dipped into liquid nitrogen to freeze the content, which was then degassed by drawing vacuum to a needle going through the septum. The procedure was repeated twice. About several drops of this well-degassed methanol was injected into the reactor to terminate the reaction. The polymer solution was then coagulated by a large volume of rapidly stirred methanol. The isolated polymer was washed again with a sufficient amount of methanol. It was first dried in the hood followed by in a vacuum oven. The resulting polymer has a GPC $M_n$ of 16,600, a GPC $M_w$ of 29,400, and DSC $T_g$ of 85° C. The stoichiometric number-average molecular weight of the polymer was calculated as follows:

$$M_s = (\text{grams of monomer})/(\text{moles initiator}) = (20 \times 0.909)/(1.4 \times 10^{-3}) = 13{,}000 \text{ g/mole}.$$

A BRABENDER™ mixer (50-g capacity) was heated to 200° C. The mixture of EXCEED™ PE 2018 (39.6 g), HDPE (HD 6706.17, 3.74 g), and the anionic polymerized PS (described above, 0.66 g) was introduced in the preheated BRABENDER™ together with 500 ppm of IRGANOX™ 1076, 1000 ppm of IRGAFOS™ 168, and 800 ppm of Dynamar™ FX 5920A. A rotor speed of 50 rpm was used throughout the run and the system was kept at temperature desired and stable. Mixing was continued for 10 min once all the blend components were incorporated in the mLLDPE. Finally the blend was discharged from the mixer and allowed to cool down. This Brabender blend is denoted as "EXCEED™+HDPE/PS".

Figure 7:
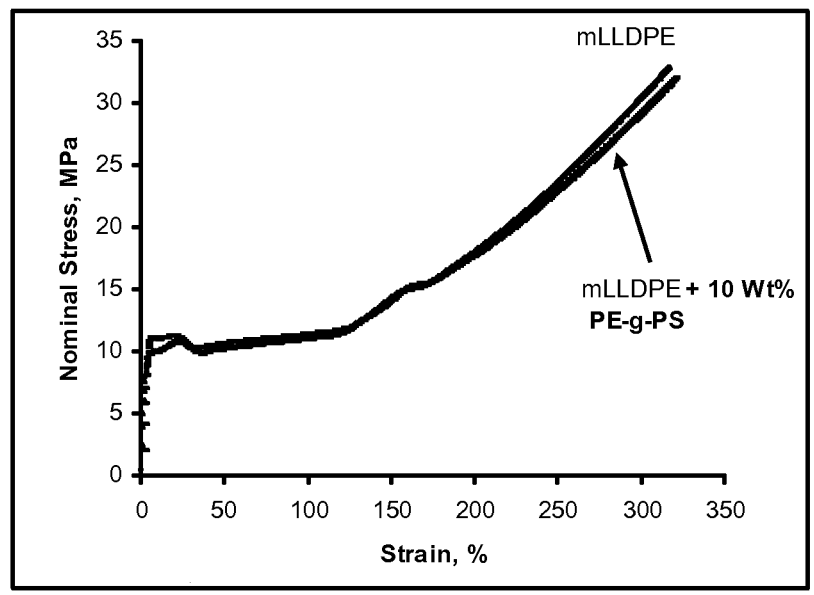
FIG. 7 depicts the stress-strain curves of mLLDPE and mLLDPE containing 10 wt % of PE-g-PS, as used in the Examples.
Figure 8:
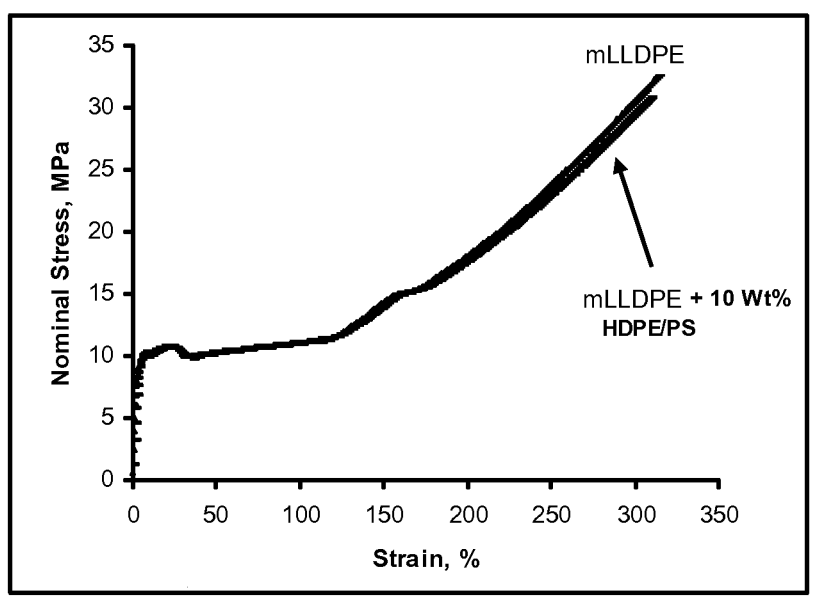
FIG. 8 depicts the stress-strain curves of mLLDPE and mLLDPE containing 10 wt % of HDPE/PS.
Figure 9:
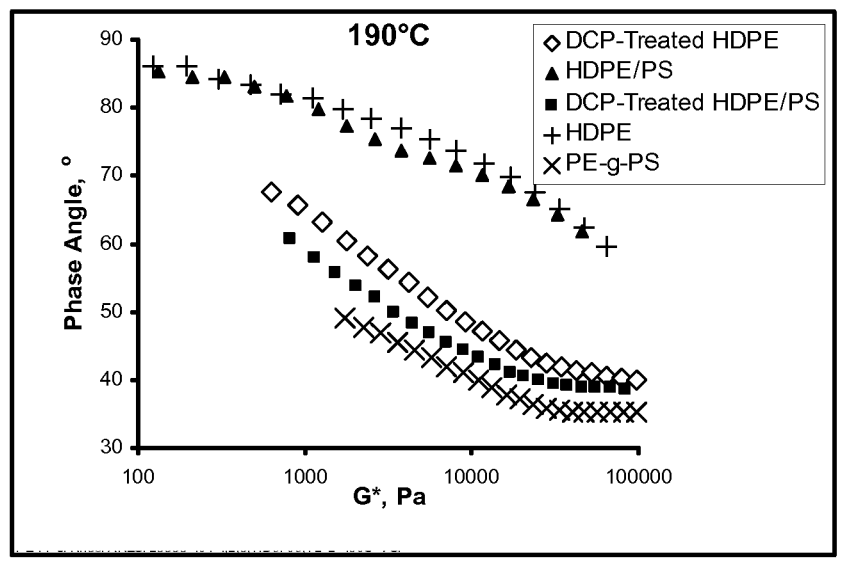
FIG. 9 depicts the van Gurp-Palmen plots of PE-g-PS to the other polymers.
Figure 10:
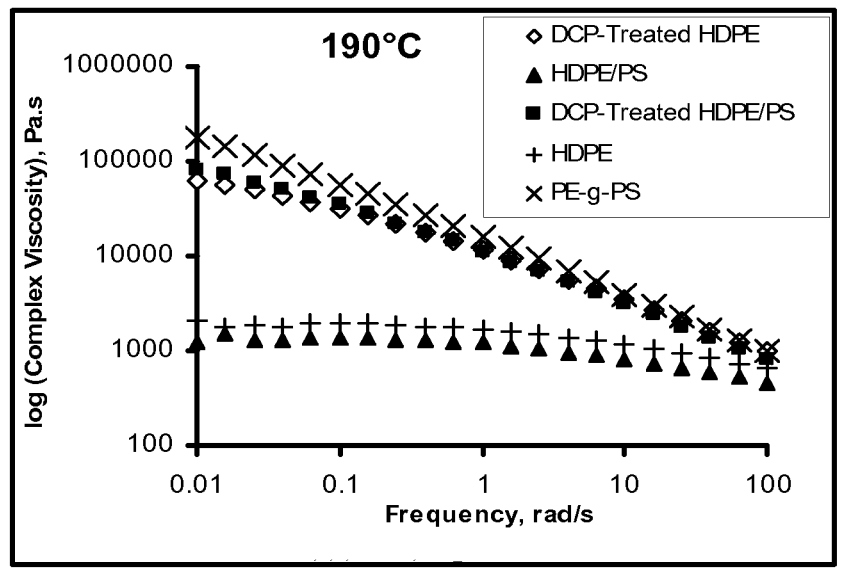
FIG. 10 depicts the complex viscosity versus frequency plots of the polymers plotted in FIG. 9, where DCP is dicumyl peroxide.
Figure 11:
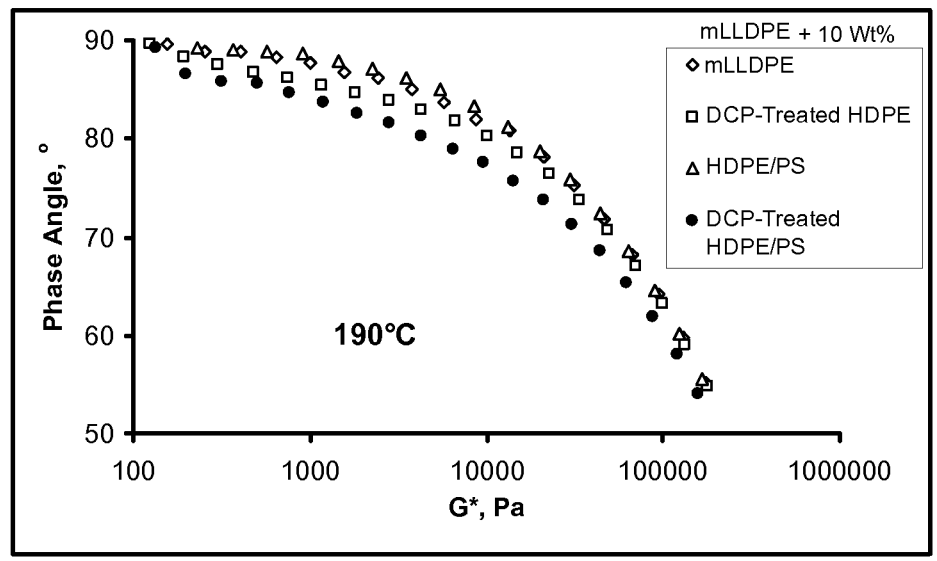
FIG. 11 depicts the van Gurp-Palmen plots of mLLDPE and mLLDPE blended with 10 wt % of various modifiers.
Figure 12:
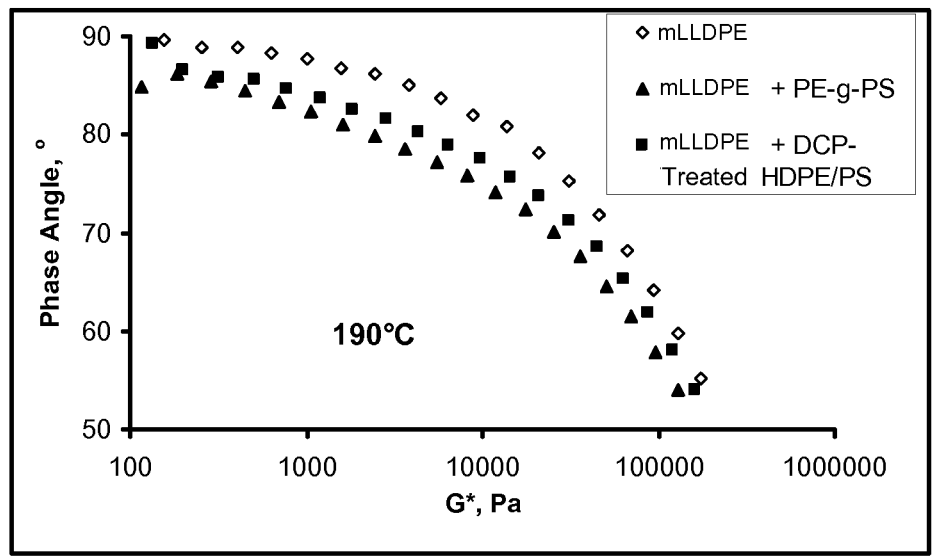
FIG. 12 depicts the complex viscosity versus frequency plots of polymers plotted in FIG. 11.

Table 4A shows the EXCEED™ PE 2018 blend properties compared to the neat EXCEED™ PE 2018 polymer. Ten wt % of PE-g-PS lowered the phase angle of EXCEED™ PE 2018; see FIGS. 3 and 5. A lower phase angle at a given G* means a higher melt elasticity. Also, 10 wt % of this PE-g-PS in EXCEED™ PE 2018 enhanced the degree of shear thinning of the host EXCEED™ PE 2018; see also The stress-strain properties of EXCEED™ PE 2018 blend properties compared to the neat EXCEED™ PE 2018 polymer are also shown in Table 4. Advantageously, 10 wt % of the inventive PE-g-PS maintains the tensile properties of EXCEED™ PE 2018; see also FIG. 7. In contrast, HDPE/PS produces a greater drop in tensile strength and elongation at break relative to the neat EXCEED™ PE 2018 polymer; see also FIG. 8.

EXCEED™ Polyethylene 1018 ("EXCEED™ PE 1018"), an mLLDPE available from ExxonMobil Chemical Company (Houston, Tex.), has an MI of 1.0 dg/min, a density of 0.918 g/cm$^3$, and a DSC $T_c$ of 105° C., a DSC $T_m$ of 118° C., and DSC heat of fusion of 122 J/g. It is expected that the PE-g-PS in Example 3 or similar copolymers described in the embodiments of the present invention will also improve the melt strength and shear thinning of this linear ethylene containing polymer in applications, such as blown film, cast film, sheet, pipe and fiber extrusion and co-extrusion as well as blow molding, injection molding and rotary molding.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, "comprising" encompasses the terms "consisting essentially of," "is," and "consisting of" and anyplace "comprising" is used "consisting essentially of," "is," or "consisting of" may be substituted therefor.

What is claimed is:

1. A method for producing an alkene terminated polystyrene, comprising:
   contacting a styrenic block copolymer and an alkene in the presence of a metathesis catalyst under conditions sufficient to produce an alkene terminated polystyrene having an unsaturation functionality of at least 0.7 and a MWD of about 1.5 or less; wherein the metathesis catalyst is selected from one or more of the following structures:

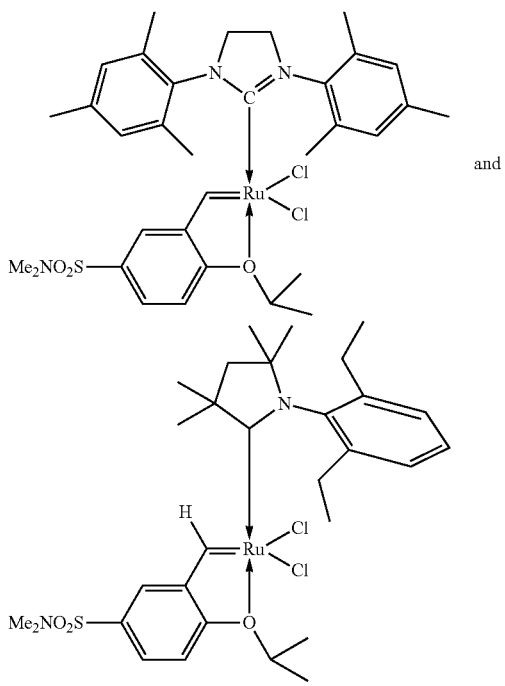

and wherein Me is methyl.

2. The method of claim 1, wherein the alkene is ethylene and the alkene terminated polystyrene is a vinyl terminated polystyrene.

3. The method of claim 1, wherein the styrenic block copolymer comprises butadiene blocks.

4. The method of claim 1, wherein the styrenic block copolymer is one or more of a styrene-butadiene diblock; a styrene-butadiene-styrene triblock; a styrene-butadiene multiblock; a styrene-butadiene star block represented by the formula $(SB)_n$, where S represents a styrenic block, B represents a butadiene block, and n is the number of arms and is an integer from 3 to 20; and blends thereof.

5. The method of claim 1, wherein the styrenic block copolymer is a styrene-butadiene-styrene triblock copolymer or blends thereof.

6. The method of claim 3, wherein the butadiene block is derived from 1,4-butadiene.

7. The method of claim 2, wherein the vinyl terminated polystyrene has a MWD of about 1.2 or less.

8. The method of claim 2, wherein the $M_W$ of the vinyl terminated polystyrene is within 15% of the $M_W$ of a single styrenic block of the styrenic block copolymer.

9. A method for producing a functionalized polymer, comprising:
   contacting a styrenic block copolymer and ethylene in the presence of a metathesis catalyst under conditions sufficient to produce a vinyl terminated polystyrene having an unsaturation functionality of at least 0.7 and a MWD of about 1.5 or less; and
   grafting the vinyl terminated polystyrene to a polyolefin to form a polyolefin/polystyrene graft copolymer.

10. The method of claim 9, wherein the polyolefin is a linear polyethylene.

11. The method of claim 6, wherein the catalyst comprises at least one of ruthenium, tungsten, and molybdenum.

12. The method of claim 9, wherein the vinyl terminated polystyrene is grafted to the polyolefin by reactive blending in the presence of at least one organic peroxide.

13. The method of claim 12, wherein the organic peroxide is dicumyl peroxide.

14. The method of claim 9, wherein a diblock copolymer of polystyrene and polyolefin is produced in a yield of at least 40 wt %, based on the weight of the graft copolymer composition.

15. A method for producing a functionalized polymer, comprising:
   contacting a styrenic block copolymer and ethylene in the presence of a metathesis catalyst under conditions sufficient to produce a vinyl terminated polystyrene having a functionality of at least 0.7 and a MWD of about 1.5 or less; and
   contacting the vinyl terminated polystyrene with ethylene monomer in the presence of a polymerization catalyst system to form a polyethylene/polystyrene copolymer.

16. The method of claim 15, wherein the polymerization catalyst system comprises at least one metallocene catalyst and an activator.

17. The method of claim 15, wherein the vinyl terminated polystyrene and the ethylene monomer are polymerized in the presence of at least one metallocene catalyst and an alumoxane.

18. The method of claim 15, wherein the vinyl terminated polystyrene and the ethylene monomer are polymerized in the same reaction zone as that in which the styrenic block copolymer and the ethylene are contacted to produce the vinyl terminated polystyrene.

* * * * *